US012377300B2

(12) United States Patent
Bucher et al.

(10) Patent No.: US 12,377,300 B2
(45) Date of Patent: Aug. 5, 2025

(54) DRY SPRINKLER

(71) Applicant: VICTAULIC COMPANY, Easton, PA (US)

(72) Inventors: Richard A. Bucher, Jaimson, PA (US); Frank J. Cygler, Nazareth, PA (US); William J. Reilly, Langhorne, PA (US); Yi Liu, Dalian (CN); Lawrence W. Thau, Jr., Flemington, NJ (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

(21) Appl. No.: 17/866,892

(22) Filed: Jul. 18, 2022

(65) Prior Publication Data

US 2022/0347505 A1 Nov. 3, 2022

Related U.S. Application Data

(63) Continuation of application No. 16/576,842, filed on Sep. 20, 2019, now Pat. No. 11,389,679, which is a continuation of application No. 15/054,645, filed on Feb. 26, 2016, now Pat. No. 10,449,402, which is a continuation-in-part of application No. 13/722,571, filed on Dec. 20, 2012, now Pat. No. 9,345,918.

(51) Int. Cl.

| | |
|---|---|
| ***A62C 35/62*** | (2006.01) |
| ***A62C 35/68*** | (2006.01) |
| ***A62C 37/11*** | (2006.01) |

(52) U.S. Cl.

CPC .............. *A62C 35/62* (2013.01); *A62C 35/68* (2013.01); *A62C 37/11* (2013.01); *Y10T 137/0486* (2015.04)

(58) Field of Classification Search

CPC ......... A62C 35/62; A62C 35/68; A62C 37/11; A62C 37/14; A62C 3/004; Y10T 137/0486

USPC .......................................................... 169/17

See application file for complete search history.

(56) References Cited

U.S. PATENT DOCUMENTS

| | | | |
|---|---|---|---|
| 1,542,462 | A | 6/1925 | Loepsinger |
| 2,155,990 | A | 4/1939 | Hodgman, Jr. |

(Continued)

FOREIGN PATENT DOCUMENTS

| | | | |
|---|---|---|---|
| CA | 2765874 | A1 | 3/2011 |
| CN | 2380254 | Y | 5/2000 |

(Continued)

OTHER PUBLICATIONS

Mar. 27, 2015 Office Action issued in U.S. Appl. No. 13/176,834.

(Continued)

*Primary Examiner* — Cody J Lieuwen
(74) *Attorney, Agent, or Firm* — Oliff PLC

(57) ABSTRACT

A dry sprinkler is provided that includes a conduit with a fluid inlet and a fluid outlet, a valve positioned near the fluid inlet and a fire sprinkler head that is positioned near the fluid outlet. The fire sprinkler head is operably connected to the valve by a tie. When the fire sprinkler head reacts to an elevated temperature condition, the tie is engaged and is operable to open the valve. In a normal state, before the fire sprinkler head reacts, the tie can be unbiased toward the fire sprinkler head. The tie can also be non-rigid and/or in a non-compressed state within the conduit. The conduit of the dry sprinkler can be flexible.

8 Claims, 20 Drawing Sheets

(56) References Cited

U.S. PATENT DOCUMENTS

| | | | | | |
|---|---|---|---|---|---|
| 2,265,810 | A | | 12/1941 | Lowe et al. | |
| 2,374,686 | A | | 5/1945 | Knight | |
| 2,871,953 | A | | 2/1959 | Bray | |
| 3,135,331 | A | | 6/1964 | Lee | |
| 3,309,028 | A | | 3/1967 | Zieg et al. | |
| 3,584,689 | A | | 6/1971 | Willms | |
| 3,616,860 | A | | 11/1971 | Williams | |
| 3,949,812 | A | | 4/1976 | Hay | |
| 4,177,862 | A | * | 12/1979 | Bray | A62C 37/10 169/17 |
| 4,220,208 | A | | 9/1980 | Jackson et al. | |
| 4,305,469 | A | | 12/1981 | Morrisette | |
| 4,569,708 | A | * | 2/1986 | Tanaka | D07B 1/162 428/375 |
| 4,648,460 | A | | 3/1987 | McCulloch | |
| 5,188,184 | A | | 2/1993 | Northill | |
| 5,396,959 | A | | 3/1995 | Macdonald | |
| 5,415,239 | A | | 5/1995 | Kotter et al. | |
| 5,533,576 | A | | 7/1996 | Mears | |
| 5,570,745 | A | | 11/1996 | MacDonald, III | |
| 5,743,337 | A | | 4/1998 | MacDonald, III | |
| 5,775,431 | A | | 7/1998 | Ondracek | |
| 5,967,237 | A | | 10/1999 | Sundholm | |
| 5,967,240 | A | | 10/1999 | Ondracek | |
| 6,024,175 | A | | 2/2000 | Moore, Jr. et al. | |
| 6,105,678 | A | | 8/2000 | Tsai | |
| 6,119,784 | A | | 9/2000 | MacDonald, III et al. | |
| 6,158,519 | A | | 12/2000 | Kretschmer | |
| 6,286,604 | B1 | | 9/2001 | Ou | |
| 6,293,348 | B1 | | 9/2001 | Reilly | |
| 6,340,058 | B1 | | 1/2002 | Dominick et al. | |
| 6,484,513 | B1 | | 11/2002 | Chou | |
| 6,536,533 | B2 | | 3/2003 | Reilly | |
| 6,666,277 | B2 | | 12/2003 | Reilly | |
| 6,691,790 | B1 | | 2/2004 | MacDonald, III et al. | |
| 6,708,771 | B2 | | 3/2004 | Reilly | |
| 6,851,482 | B2 | | 2/2005 | Dolan | |
| 7,055,612 | B2 | | 6/2006 | Jackson et al. | |
| 7,185,711 | B2 | | 3/2007 | Jackson et al. | |
| 7,213,319 | B2 | | 5/2007 | Silva, Jr. et al. | |
| 7,373,720 | B1 | | 5/2008 | Jensen et al. | |
| 7,416,030 | B2 | | 8/2008 | Lupien et al. | |
| 7,516,800 | B1 | | 4/2009 | Silva, Jr. et al. | |
| 7,644,736 | B2 | | 1/2010 | Bittenbender et al. | |
| 7,766,252 | B2 | | 8/2010 | Jackson et al. | |
| 7,823,650 | B2 | | 11/2010 | Eckholm et al. | |
| 8,127,860 | B2 | | 3/2012 | Golinveaux | |
| 9,345,918 | B2 | | 5/2016 | Bucher et al. | |
| 2002/0003042 | A1 | | 1/2002 | Reilly | |
| 2002/0011342 | A1 | | 1/2002 | Reilly | |
| 2002/0050531 | A1 | | 5/2002 | Dolan | |
| 2002/0121381 | A1 | | 9/2002 | Reilly | |
| 2003/0075343 | A1 | | 4/2003 | Ballard | |
| 2004/0011537 | A1 | | 1/2004 | Jackson et al. | |
| 2004/0123989 | A1 | | 7/2004 | Sprakel et al. | |
| 2005/0121206 | A1 | | 6/2005 | Dolan | |
| 2009/0008104 | A1 | | 1/2009 | MacDonald, III et al. | |
| 2010/0038099 | A1 | * | 2/2010 | Thompson | A62C 37/11 169/37 |
| 2010/0263881 | A1 | | 10/2010 | Fritz | |
| 2011/0315407 | A1 | | 12/2011 | Park et al. | |
| 2012/0097406 | A1 | | 4/2012 | Silcox et al. | |
| 2012/0132444 | A1 | * | 5/2012 | Buzdum | A62C 35/68 169/17 |
| 2012/0298382 | A1 | | 11/2012 | Shipman | |
| 2012/0298383 | A1 | | 11/2012 | Shipman | |
| 2013/0037281 | A1 | * | 2/2013 | Szentimrey | A62C 35/62 169/54 |
| 2013/0199803 | A1 | * | 8/2013 | Multer | A62C 35/68 169/17 |

FOREIGN PATENT DOCUMENTS

| | | | |
|---|---|---|---|
| CN | 101426585 | A | 5/2009 |
| CN | 201524372 | U | 7/2010 |
| CN | 102472418 | A | 5/2012 |
| DE | 52184 | C | 5/1889 |
| DE | 39 19 638 | C1 | 11/1990 |
| DE | 202005011642 | U1 | 12/2005 |
| EP | 2 123 689 | A | 2/1984 |
| EP | 1 368 589 | A2 | 12/2003 |
| EP | 2 623 161 | A2 | 8/2013 |
| JP | S52-11998 | A | 1/1977 |
| JP | S56-066355 | U | 6/1981 |
| JP | S57-079555 | U | 5/1982 |
| JP | S59-000155 | A | 1/1984 |
| JP | S59-133251 | U | 9/1984 |
| JP | H02-096161 | U | 7/1990 |
| JP | H03-27259 | U | 3/1991 |
| JP | H03-231684 | A | 10/1991 |
| JP | H06-170008 | A | 6/1994 |
| JP | H10-142251 | A | 5/1998 |
| JP | H11-76448 | A | 3/1999 |
| JP | H1176449 | A | 3/1999 |
| JP | 2006-230645 | A | 9/2006 |
| JP | 2008-544808 | A | 12/2008 |
| KP | 10-1259098 | A | 5/2013 |
| KR | 20060123973 | A | 12/2006 |
| KR | 20110110657 | A | 10/2011 |
| KR | 20110114985 | A | 10/2011 |
| KR | 20120021587 | A | 3/2012 |
| KR | 2012-0098205 | B1 | 9/2012 |
| WO | 02/070071 | A2 | 9/2002 |
| WO | 2007/005286 | A2 | 1/2007 |
| WO | 2011/031722 | A1 | 3/2011 |
| WO | 2012/166636 | A1 | 12/2012 |
| WO | 2012/166644 | A1 | 12/2012 |

OTHER PUBLICATIONS

Apr. 22, 2015 Extended European Search Report issued in European Patent Application No. 12792109.6.

May 11, 2015 Search Report issued in European Patent Application No. 12793586.4.

May 11, 2015 Supplemental Search Report issued in European Patent Application No. 12792109.6.

May 6, 2015 Office Action issued in Chinese Patent Application No. 201280037396.6.

Jul. 2, 2015 International Preliminary Report on Patentability issued in Application No. PCT/US2013/052835.

Sep. 29, 2014 Office Action issued in U.S. Appl. No. 13/176,834.

Oct. 14, 2014 Office Action issued in U.S. Appl. No. 13/480,786.

Oct. 31, 2014 First Examination Report issued in New Zealand Patent Application No. 618905.

May 15, 2015 Search Report issued in European Application No. 12793586.4.

May 20, 2015 Supplemental Search Report issued in European Application No. 12792109.6.

Jul. 16, 2015 Office Action issued in U.S. Appl. No. 13/176,834.

Nov. 30, 2015 Office Action issued in U.S. Appl. No. 13/722,571.

Nov. 30, 2015 Office Action issued in U.S. Appl. No. 13/480,786.

Jan. 25, 2016 Office Action issued in U.S. Appl. No. 13/176,834.

Oct. 31, 2014 Office Action issued in New Zealand Patent Application No. 235587NZPR.

Aug. 7, 2014 Search Report issued in PCT Application No. PCT/US2013/052835.

Mar. 24, 2015 Office Action issued in U.S. Appl. No. 13/480,786.

Apr. 15, 2015 Extended European Search Report issued in European Patent Application No. 12792109.6.

Mar. 18, 2014 Office Action issued in U.S. Appl. No. 13/176,834.

Mar. 21, 2014 Office Action issued in U.S. Appl. No. 13/480,786.

Apr. 13, 2016 Office Action Issued in U.S. Appl. No. 13/176,834.

May 3, 2016 Notice of Allowance issued in U.S. Appl. No. 13/176,834.

Aug. 5, 2016 Office Action issued in European Patent Application No. 13 745 781.8.

(56) References Cited

OTHER PUBLICATIONS

Jun. 30, 2016 Office Action issued in Canadian Patent Application No. 2,895,673.
Nov. 15, 2016 Office Action issued in Japanese Patent Application No. 2014-512157.
Apr. 5, 2016 Office Action issued in Japanese Patent Application No. 2014-512157.
Jan. 20, 2017 Office Action issued in U.S. Appl. No. 15/134,753.
Apr. 21, 2017 Office Action with Search Report issued in Chinese Patent Application No. 201380073463.4.
Aug. 3, 2017 Office Action Issued in U.S. Appl. No. 15/134,753.
Aug. 8, 2017 Office Action issued in European Patent Application No. 13745781.8.
Aug. 2, 2017 Office Action issued in Chinese Patent Application No. 201280037396.6.
Dec. 14, 2017 Office Action issued in Korean Patent Application No. 10-2013-7034115.
Dec. 14, 2017 Office Action issued in Korean Patent Application No. 10-2013-7034121.
Dec. 19, 2017 Search Report issued in Singapore Patent Application No. 10201601409U.
Dec. 26, 2017 Office Action issued in Chinese Patent Application No. 201380073463.4.
Mar. 19, 2018 Office Action issued in U.S. Appl. No. 15/151,847.
May 14, 2018 Office Action issued in U.S. Appl. No. 15/054,645.
May 3, 2018 Office Action issued in European Patent Application No. 13 745 781.8.
May 15, 2018 Office Action issued in Canadian Patent Application No. 2,837,318.
May 10, 2018 Office Action issued in Canadian Patent Application No. 2,837,316.
Jun. 25, 2018 Office Action issued in Chinese Patent Application No. 201380073463.4.
Jul. 31, 2018 Office Action issued in Korean Patent Application No. 10-2017-7022996.
Sep. 19, 2018 Office Action issued in Chinese Patent Application No. 201280037396.6.
Oct. 31, 2018 Office Action issued in Korean Patent Application No. 10-2013-7034121.
Dec. 14, 2018 Office Action issued in U.S. Appl. No. 15/054,645.
Jan. 7, 2019 Office Action issued in U.S. Appl. No. 15/151,847.
Mar. 5, 2019 Office Action issued in Canadian Patent Application No. 2,837,318.
Mar. 5, 2019 Office Action issued in Indian Patent Application No. 10252/CHENP/2013.
Apr. 8, 2019 Office Action issued in Indian Patent Application No. 3797/CHENP/2015.
Mar. 28, 2019 Written Opinion issued in Singapore Patent Application No. 10201601409U.
Apr. 5, 2019 Office Action issued in Indian Patent Application No. 10247/CHENP/2013.
Mar. 27, 2019 Office Action issued in Chinese Patent Application No. 201280037396.6.
Mar. 8, 2019 Office Action issued in Korean Patent Application No. 10-2013-7034121.
May 13, 2019 Office Action issued in European Patent Application No. 12 793 586.4.
May 13, 2019 Office Action issued in European Patent Application No. 12 792 109.6.

* cited by examiner

DRY SPRINKLER

RELATED APPLICATIONS

This is a continuation of U.S. patent application Ser. No. 16/576,842, filed Sep. 20, 2019, which in turn is a continuation of U.S. patent application Ser. No. 15/054,645, filed Feb. 26, 2016, now U.S. Pat. No. 10,449,402, which in turn is a continuation-in-part of U.S. patent application Ser. No. 13/722,571, filed Dec. 20, 2012, now U.S. Pat. No. 9,345, 918. The disclosure of the prior applications is hereby incorporated by reference herein in its entirety.

TECHNICAL FIELD

This disclosure relates to dry sprinklers that are used in fire protection systems in buildings and other structures, and more particularly to dry sprinklers having a flexible conduit that extends between a sprinkler head and a sprinkler valve. The dry sprinkler can be connected to a branch fluid supply line that distributes fire suppression fluid, such as water.

BACKGROUND

Dry sprinklers are used in fire protection systems to extinguish or suppress fires. Dry sprinklers can be connected to a fluid distribution system that is installed in buildings or other structures. The fluid distribution system is connected to a fluid supply, specifically water or another fire suppression fluid. Dry sprinklers usually include a sprinkler head and a rigid, inflexible conduit connecting the sprinkler head to a connector fitting on a branch fluid supply line. The conduit includes a valve that is positioned at the connector fitting end, and the valve remains closed under normal conditions so that no fluid enters the sprinkler conduit until the sprinkler is actuated to release the fire suppression fluid. Dry sprinklers have sprinkler heads that are equipped with a thermally responsive component that is designed to be activated in the event of fire.

The thermally responsive component of the fire sprinkler head rapidly triggers the valve to open and release fluid through the sprinkler to extinguish the fire. As the triggering mechanism, dry sprinklers usually employ a rigid, inflexible link member that is positioned between the valve and the fire sprinkler head and is pressed against the fire sprinkler head by the force of fluid that is incident on the valve. When the thermally responsive element reacts in response to a fire, the link member is pushed out of the way of the valve by the fluid pressure or gravity, which causes the valve to open.

SUMMARY

Dry sprinklers can be particularly useful in unconditioned (e.g., unheated) spaces such as attics, balconies, breezeways, and walkways, because the conduit of a dry sprinkler contains no fluid under normal conditions and there is therefore less risk of freeze breakages or other damage. Accordingly, in contrast to wet sprinkler systems, there is no need to take countermeasures to prevent freezing of the fluid in the sprinkler. For similar reasons, dry sprinklers are useful in spaces that are maintained under refrigerated (including freezing) conditions.

Installation of dry sprinklers can be difficult. During installation of the sprinkler system, the fluid distribution system is usually first installed, including the network of pipes with the branch fluid supply lines. Once the branch lines are installed, the installer determines the lengths of the dry sprinkler that is needed based on the distance from the desired sprinkler head location to the connector fitting on the branch line. The dry sprinklers are ordered at the specific length and configuration determined by the installer, and the dry sprinklers are then made-to-order and shipped to the installer, which can cause delays in construction of up to two weeks or more. Such delays are undesirable and can greatly increase construction expense. Alternatively, the system designer and/or specifications may mandate the sprinkler lengths. However, even in those circumstances, adjustments may have to be made in the field, which may cause undesired delays.

Also, once the branch line piping has been installed, it is difficult to move the location of the sprinkler head. Likewise, in some cases, the location of the sprinkler head will be limited by the construction based on where the branch line pipe can be installed.

According to one aspect, a dry sprinkler is provided that includes a fluid conduit that is configured to couple to a fluid supply, a valve that is positioned proximate to a first end of the conduit, the valve having a closed state that prevents fluid from the fluid supply from flowing through the conduit and an open state that allows fluid from the fluid supply to flow through the conduit, a fire sprinkler head positioned proximate to a second end of the conduit, the fire sprinkler head having a thermally responsive element that reacts to an elevated temperature condition, and an unbiased tie positioned within the conduit that is operably coupled to the valve, where the unbiased tie has at least an unengaged state and an engaged state. The unbiased tie is not biased towards the sprinkler head in the unengaged state, the reaction of the thermally responsive element to the elevated temperature condition causes the tie to change from the unengaged state to the engaged state, and changing the tie to the engaged state from the unengaged state allows the valve to change from the closed state to the open state.

According to another aspect, a dry sprinkler is provided that includes a flexible conduit that is configured to be coupled to a fluid supply, a valve positioned proximate to a first end of the conduit, the valve having a sealing member that is urged to a closed position in which fluid from the fluid supply is prevented from flowing through the conduit, the sealing member being movable to an open position in which fluid from the fluid supply flows through the conduit, a fire sprinkler head positioned proximate to a second end of the conduit, the fire sprinkler head having a thermally responsive element that is configured to react to an elevated temperature condition, an unbiased tie positioned within the flexible conduit and being present in the flexible conduit in a state such that the unbiased tie is not biased toward the fire sprinkler head, a first portion of the unbiased tie being operably coupled to the sealing member to urge it to the open position when the unbiased tie is engaged, an engagement action connected to the second portion of the unbiased tie, the engagement action being operably coupled to the thermally responsive element so that when the thermally responsive element reacts to the elevated temperature condition, the engagement action is triggered to apply tension to the unbiased tie thereby causing the tie to move the sealing member to the open position.

According to another aspect, a dry sprinkler is provided that includes a flexible conduit that is configured to be coupled to a fluid supply line, a valve positioned proximate to a first end of the conduit, the valve having a closed state in which fluid from the fluid supply is prevented from flowing through the conduit and an open state in which fluid from the fluid supply is allowed to flow through the conduit, an unbiased tie having a first portion that is operably coupled to the valve to open the valve when the unbiased tie is engaged, the unbiased tie being present in a state such that the tie is not biased toward the second end of the conduit, a sheath member that is located within the conduit and surrounds the unbiased tie over most of the length of the unbiased tie, and a fire sprinkler head positioned proximate to a second end of the conduit, the fire sprinkler head having a thermally responsive element that reacts to an elevated temperature condition. The unbiased tie is operably connected to the thermally responsive element so that the reaction of the thermally responsive element to the elevated temperature condition causes the tie to be engaged.

According to another aspect, a dry sprinkler is provided that includes a flexible conduit, a valve located proximate to a first end of the flexible conduit, a fire sprinkler head located proximate to a second end of the flexible conduit, an unbiased tie located within the flexible conduit and being present in a state such that the unbiased tie is not biased toward the fire sprinkler head, a first portion of the unbiased tie being operably coupled to the valve such that tensioning the tie allows the valve to move to an open position, and tensioning means for applying tension to the unbiased tie.

According to another aspect, a fire protection sprinkler system is provided that includes a network of pipes connected to a fluid supply, a control valve in fluid communication with the network of pipes and the fluid supply, the control valve configured to control the flow of fluid between the fluid supply and the network of pipes, at least one dry sprinkler fluidly connected to the network of pipes, the dry sprinkler including a conduit, a fire sprinkler head positioned proximate to the fluid outlet of the conduit, the fire sprinkler head having a thermally responsive element that reacts to an elevated temperature condition, a sprinkler valve positioned proximate the fluid inlet and having a closed state preventing flow of fluid through the conduit, and an open state allowing flow of fluid through the conduit, an unbiased tie positioned within the conduit and being present in the conduit in a state such that the unbiased tie is not biased toward the fire sprinkler head, a first portion of the unbiased tie being operably coupled to the sprinkler valve such that engaging the unbiased tie allows the valve to move to the open state, and an engagement action that is coupled to a second portion of the unbiased tie, and reaction of the thermally responsive element to the elevated temperature condition causes the engagement action to apply tension to the unbiased tie.

According to another aspect, a dry sprinkler is provided that includes a flexible conduit that is configured to be coupled to a fluid supply line, a valve positioned proximate to a first end of the conduit, the valve having a closed state in which fluid from the fluid supply is prevented from flowing through the conduit and an open state in which fluid from the fluid supply is allowed to flow through the conduit, an unbiased tie having a first portion that is operably coupled to the valve such that engaging the unbiased tie allows the valve to open, the unbiased tie being present in a state such that the tie is not biased toward the second end of the conduit, and a fire sprinkler head positioned proximate to a second end of the conduit, the fire sprinkler head having a thermally responsive element that reacts to an elevated temperature condition. The unbiased tie is operably connected to the thermally responsive element so that the reaction of the thermally responsive element to the elevated temperature condition causes the tie to be engaged.

According to another aspect, a dry sprinkler is provided that includes a flexible conduit that is configured to be coupled to a fluid supply, a valve positioned proximate to a first end of the conduit, the valve having a closed state in which fluid is prevented from flowing through the conduit and an open state in which fluid is allowed to flow through the conduit, an uncompressed tie having a first portion that is operably coupled to the valve such that engaging the uncompressed tie allows the valve to open, the uncompressed tie being present in a state such that it is not under compressive force, and a fire sprinkler head positioned proximate to a second end of the conduit, the fire sprinkler head having a thermally responsive element that reacts to an elevated temperature condition, wherein the uncompressed tie is operably connected to the thermally responsive element.

According to another aspect, a dry sprinkler is provided that includes a flexible conduit that is configured to be coupled to a fluid supply, a valve positioned proximate to a first end of the conduit, the valve having a closed state in which fluid is prevented from flowing through the conduit and an open state in which fluid is allowed to flow through the conduit, a substantially non-rigid tie having a first portion that is operably coupled to the valve such that engaging the non-rigid tie allows the valve to open, and a fire sprinkler head positioned proximate to a second end of the conduit, the fire sprinkler head having a thermally responsive element that reacts to an elevated temperature condition, wherein the non-rigid tie is operably connected to the thermally responsive element.

According to yet another aspect, a method of triggering a dry sprinkler in the event of a fire is provided, where the dry sprinkler includes (i) a conduit that is coupled to the fluid supply, (ii) a valve that is positioned proximate to a first end of the conduit and is urged to a closed state to prevent fluid from the fluid supply from flowing through the conduit, (iii) a fire sprinkler head that is positioned proximate to a second end of the conduit and includes a thermally responsive element that reacts to an elevated temperature condition, and (iv) a nontensioned tie that is operably coupled to the valve such that engaging the nontensioned tie allows the valve to open, and the method includes the steps of engaging the tie upon reaction of the thermally responsive element to the elevated temperature condition and applying tension to the tie at least until the valve opens and allows fluid from the fluid supply to flow through the conduit.

According to still another aspect, a method of installing a flexible dry sprinkler on a branch fluid line is provided. The method includes (i) providing a flexible dry sprinkler, which includes a flexible conduit, a valve disposed proximate to the inlet end of the flexible conduit, the valve having a closed state that prevents flow of fluid from the fluid supply through the conduit and an open state that allows flow of fluid from the fluid supply through the conduit, a fire sprinkler head positioned proximate to the outlet end of the conduit, the fire sprinkler head having a thermally responsive element that reacts to an elevated temperature condition, and a tie positioned within the flexible conduit, the tie having a first portion and a second portion, the first portion being operably connected to the valve to urge the valve to an open position when the tie is engaged, and the second portion being operably connected to the thermally responsive element to engage the tie when the thermally responsive element reacts to an elevated temperature condition, (ii) connecting the flexible dry sprinkler to the branch fluid line, (iii) bending the flexible conduit to locate the fire sprinkler head, and (iv) securing the flexible dry sprinkler in a fixed position with a bracket. The flexible dry sprinkler is installed on the branch line and secured with the bracket without engaging the tie and without opening the valve.

BRIEF DESCRIPTION OF THE DRAWINGS

Exemplary embodiments are described in detail below with reference to the accompanying drawings in which.

DETAILED DESCRIPTION OF THE EMBODIMENTS

Figure 1:
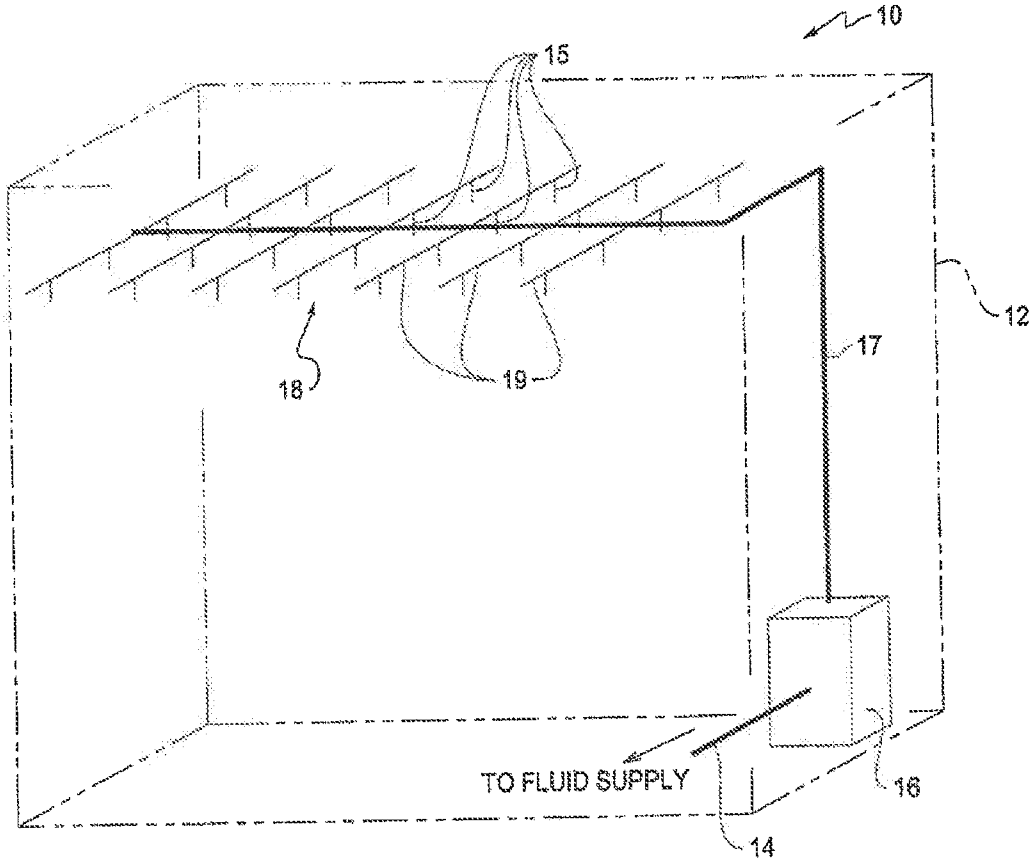
FIG. 1 is a schematic diagram illustrating a fire protection sprinkler system.

The dry sprinklers provided by this disclosure can be used in connection with fire protection sprinkler systems that are installed in buildings or on other structures. FIG. 1 is a schematic representation of an exemplary embodiment of a fire protection sprinkler system 10 that is installed in structure 12. The fire protection sprinkler system 10 includes a fluid supply line 14 that is connected to a supply of fire suppressive fluid. The fluid supply can be a water source such as the water supply that is provided by municipalities, a water container, or a container containing a fire suppressive fluid other than water (e.g., fluid for a fire suppressive foam, powder or similar fire suppressant).

The fluid supply line 14 connects to a control valve 16 that controls fluid supply to a network of pipes 18. The control valve 16 is in fluid communication with a main fluid supply line 17 that supplies fire suppression fluid to a plurality of branch lines 19 that extend from the main line 17. Each of the branch lines 19 supply the fire suppression fluid to a plurality of dry sprinklers 15. In the event of a fire (or other similar elevated temperature event), the dry sprinklers 15 are configured to distribute the fire suppression fluid within the structure 12 to extinguish or suppress the fire.

Although FIG. 1 illustrates the dry sprinklers 15 in a pendant position, the sprinklers can be configured in any position, including an upright, pendant or sidewall position.

Figure 2A:
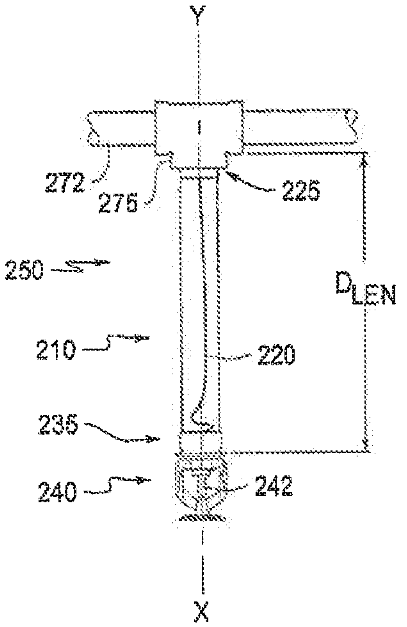
FIGS. 2A-2C are cross-sectional schematic diagrams of a flexible dry sprinkler according to one embodiment.
Figure 2B:
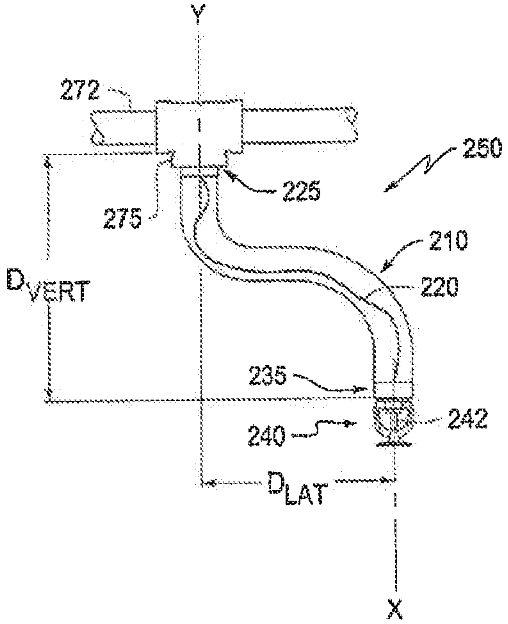
Figure 2C:
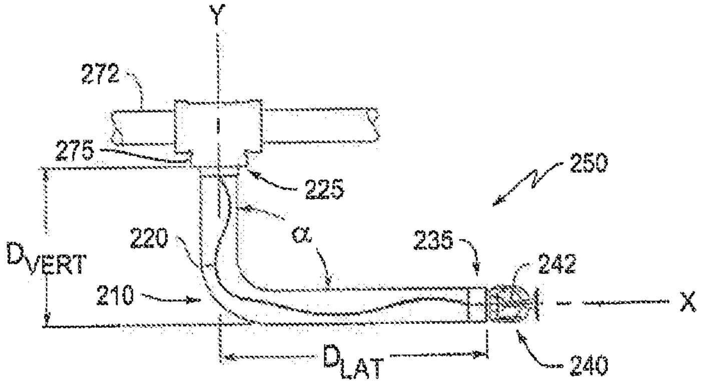

FIGS. 2A-2C are schematic diagrams illustrating a flexible dry sprinkler 250. The dry sprinkler 250 is connected to branch line 272. The dry sprinkler 250 includes a conduit 210 with a first end portion 225 and a second end portion 235. A connector 275 fluidly connects the first end portion 225 to the branch line 272. For example, the connector 275 can include a threaded opening to receive corresponding threads on first end portion 225 of the dry sprinkler 250.

The connection of the dry sprinkler 250 to the branch line 272 forms a connection axis Y in the center of the branch line connector 275 along the length of the conduit 210 in its unbent shape (see e.g., FIG. 2A). The conduit 210 has a length labeled as $D_{LEN}$.

The dry sprinkler 250 can include a valve (not illustrated in FIGS. 2A-2C) positioned proximate to the first end 225 of the conduit 210. As discussed in greater detail below, the valve has an open state that allows fluid to flow from the branch line 272 through the conduit 210 and a closed state that prevents fluid from flowing from the branch line 272 through the conduit 210. This valve is sometimes referred to herein as a "sprinkler valve" to distinguish it from a main control valve, for example.

A fire sprinkler head 240 is coupled to the second end portion 235 of the dry sprinkler 250. The fire sprinkler head is configured to react to the elevated temperature condition in the event of fire to trigger the valve to open. The fire sprinkler head 240 can be coupled to the conduit in any suitable way, for example, by connecting a threaded end of the sprinkler head to a threaded end of the conduit or by mechanically coupling the sprinkler head into the second end of the conduit.

The dry sprinkler 250 includes a tie 220 that is positioned within the conduit 210 in this embodiment. The tie 220 generally extends from the first end portion 225 of the conduit to the second end portion 235 of the conduit and operably connects to the valve to open the valve after the fire sprinkler head reacts to the elevated temperature condition.

The tie 220 has an unengaged state and an engaged state. FIGS. 2A-2C illustrate the tie 220 in an unengaged state, which is the state that the tie 220 is in when the valve is closed. As discussed in detail below, in the event of fire, thermally responsive element 242 of the fire sprinkler head 240 reacts and triggers an engagement apparatus (also referred to herein as an "engagement action") that engages the tie 220 by applying a load to the tie 220. The load is applied by the tie 220 to a valve catch. The valve catch allows the valve to move to an open state. The tie 220 thus has an "unengaged state" in which the tie is operably coupled to the valve but the valve remains closed, and an "engaged state" in which the tie is operative to open the valve, e.g., when a load is applied to the tie. Once the tie is engaged, the valve opens and can be maintained in an open state while the tie continues to be engaged, or the valve can be thereafter maintained in an open state even if the tie returns to an unengaged state.

The tie 220 can be characterized by one or more of the following:

(a) In an unengaged state, the tie is unbiased such that it is not biased toward the sprinkler head (excepting, of course, by its own weight from the force of gravity) and/or the valve. The term "unbiased" describes a configuration in which no force is applied to the tie to urge it in the direction of the sprinkler head and/or valve. Thus, for example, fluid pressure that impinges on the valve does not apply a force to the tie to urge it towards the sprinkler head or valve, and there is likewise no mechanical device that urges the tie toward the sprinkler head or valve;

(b) In an unengaged state, the tie is not under any compressive force (likewise excepting gravitational forces), e.g., the tie is not pressed against a portion of the dry sprinkler by the fluid pressure that is incident upon the valve;

(c) In an unengaged state, the tie is not under tension, and in an engaged state the tie is under tension;

(d) In an unengaged state, the tie has substantially no rigidity;

(e) The tie cannot support its own weight and cannot support a bending stress;

(f) The tie can be bent entirely around a radius that is smaller than a cross-sectional dimension of the tie;

(g) The tie is flexible;

(h) The tie is relatively inelastic such that it does not stretch significantly in the engaged state (e.g., the tie can have an elastic modulus of from 100 MPa to 150 GPa, from 1 GPa to 50 GPa, and from 2 GPa to 10 GPa).

By way of example, the tie 220 can include a cord, a rope, a string, a loop, a chain, a chain-like member where chain link portions connect once the tie is engaged, a cable, a ribbon, a tube, a wire, a monofilament line, and a multifilament line. In the illustrated embodiments, the tie 220 is positioned entirely within the conduit. However, in some configurations, only a portion of the tie 220 can be positioned within the conduit or the entire tie 220 can be positioned outside of the conduit or in a sidewall of the conduit.

A first portion of the tie 220 can be connected to the valve catch and a second portion of the tie 220 can be connected to the engagement action. The tie 220 thus can extend from the valve catch to the engagement action, and typically extends along at least 40 percent of the length of the conduit 210, at least 60 percent of the length of the conduit 210, or at least 90 percent of the length of the conduit 210. The tie is typically positioned to cross the midpoint of the conduit 210. The size and cross-sectional dimension of the tie 220 are not particularly important so long as the tie is operable to open the valve within a desired response time.

As shown in FIGS. 2B and 2C, the conduit 210 of the dry sprinkler 250 can be flexible. Providing a flexible conduit can have significant advantages. For example, whereas in a rigid, inflexible dry sprinkler, the location of the fire sprinkler head is fixed based on the length and shape of the dry sprinkler and the location and position of the connector 275, in a flexible dry sprinkler, the location of the fire sprinkler head can be moved or variously oriented relative to the connector 275, only limited by the length and flexibility of the conduit. Using a flexible dry sprinkler is also advantageous because the specific location of the fire sprinkler head can be varied even after the network of pipes is installed. In this regard, for rigid, inflexible dry sprinklers, the network of pipes is installed in a structure, the desired locations of the sprinkler heads are determined, and the dry sprinklers are selected so that the fire sprinkler heads are positioned at or near the desired locations. This can cause some construction delays based on the time it takes for the dry sprinklers to be ordered, fabricated and delivered. Also, the dry sprinklers are typically made-to-order. In contrast, by using flexible dry sprinklers, an installer or building contractor can keep sprinklers of discrete lengths on hand and can adjust the position and angle of the sprinkler head as need requires. This should reduce construction delays. Also, the dry sprinkler manufacturer can prefabricate and supply sprinklers of discrete dimensions based on anticipated need.

The flexible conduit 210 can be used with a tie 220 having one or more of the characteristics described above, and the tie 220 can be configured with the conduit 210 so that the tie 220 is not inadvertently engaged during installation. In this regard, the tie 220 can be configured so that the fire sprinkler head can be positioned and secured at the desired location without inadvertently engaging the tie 220 and opening the valve.

As shown in FIGS. 2B and 2C, the second end of the flexible conduit 210 can be laterally displaced with respect to the first end of the conduit 210 by a distance $D_{LAT}$. The distance of lateral displacement can be characterized as a portion or percentage of the length of the conduit ($D_{LEN}$). The flexible conduit 210 can therefore be characterized in that the second end of the conduit 210 can be laterally displaced with respect to the first end of the conduit at a distance corresponding to at least 5 percent of the length of the conduit 210, at least 10 percent of the length of the conduit 210, at least 30 percent of the length of the conduit 210, from 30 to 95 percent of the length of the conduit 210, or from 50 to 90 percent of the length of the conduit 210.

As also shown in FIGS. 2B and 2C, the flexibility of the conduit can further be characterized by comparing $D_{LEN}$ with the vertical distance between the two ends of the conduit ($D_{VERT}$) when the sprinkler is in a bent state. The flexible conduit can be characterized in that the conduit is capable of bending such that $D_{VERT}$ corresponds to 75 percent or more of $D_{LEN}$, 50 percent or more of $D_{LEN}$, or 10 percent or more of $D_{LEN}$.

As shown in FIG. 2C, the angle α is the angle that the conduit 210 can be bent to achieve a desired location and orientation of the sprinkler head. In this regard, the fire sprinkler head can be positioned and secured so that the fire suppression fluid exits the dry sprinkler 250 at any desired angle. For example, whereas a straight inflexible sprinkler is fixed with respect to the connection axis Y at an angle of 180°, the flexible dry sprinkler can be configured such that the sprinkler head axis X can be displaced relative to the connection axis Y at an angle (α) of from 20° to 160°, from 45° to 135°, and from 75° to 105°.

The tie 220 is provided in or along the conduit 210 with enough slack such that (i) the tie 220 has a free length that is greater than the length of the conduit 210 that extends between the points where the tie is attached in the dry sprinkler; (ii) the fire sprinkler head can be laterally displaced with respect to the first end of the conduit by the maximum combination distance and angle (e.g., the $D_{LAT}$ distances and angles α discussed above) without a load being applied to the tie 220 that would open the valve. The presence of that slack in the tie 220 minimizes the risk that the valve will be accidentally opened when the sprinkler is transported, installed or used.

The flexible conduit 210 can include a flexible portion that comprises, for example, a corrugated tube, a hose, or a braided tube, which can be made from known materials including metal, rubber, etc. The flexible conduit 210 can include one or more flexible portions along at least 20 percent of the conduit length ($D_{LEN}$), along at least 40 percent of the conduit length, along at least 60 percent of the conduit length, along at least 80 percent of the conduit length, from 50 to 95 percent of the conduit length, or along its entire length. The flexible conduit 210 can have a low elasticity so that when it is bent into a desired position it maintains its bent shape and does not return to its original position.

In some embodiments, the flexible conduit 210 includes an inflexible portion proximate to the first end 225 (fluid inlet end) that surrounds the valve and enables the conduit to be connected to branch line 272. The flexible conduit 210 can also include an inflexible portion that is proximate to the second end 235 (fluid outlet end) of the conduit that enables the fire sprinkler head to be connected to the conduit. The inflexible portion proximate to the second end 235 can also include a reducer that is formed to have at least one flat surface so that the second end of the conduit can be secured into place by affixing a bracket to the flat surface. The other end of the bracket can be affixed to a secure structure. The bracket and inflexible portion of the conduit can be configured so that the sprinkler head is secure and resists torsional forces. In general, the installation of the sprinkler system including the bracing should comply with applicable codes and guidelines that are used in this field.

The dry sprinklers can have discrete lengths of, for example, 1 ft., 2 ft., 4 ft., 6 ft., or any length therebetween.

Figure 3:
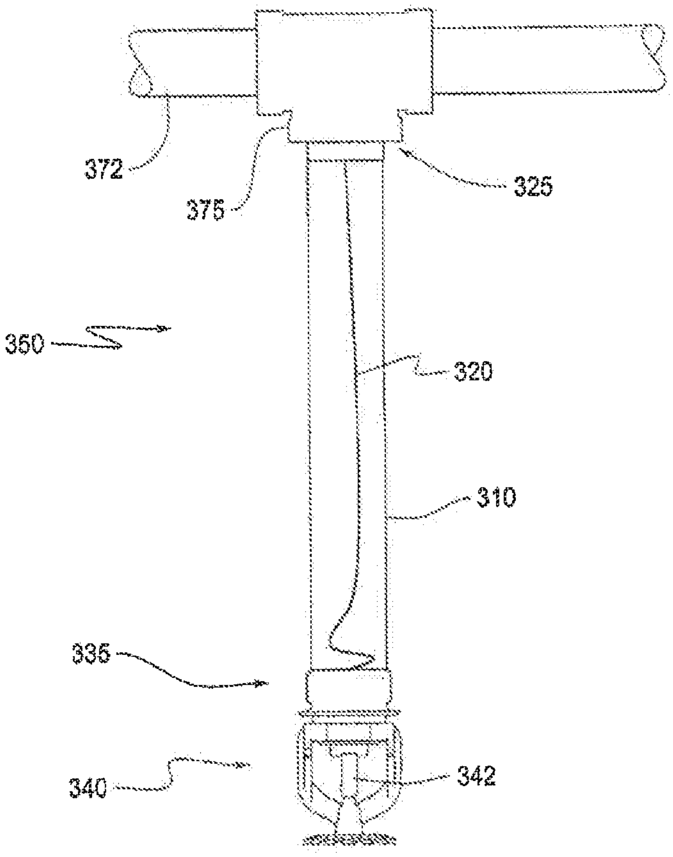
FIG. 3 is a cross-sectional schematic diagram of a rigid, inflexible dry sprinkler according to one embodiment.

In some embodiments, the dry sprinkler can be rigid and inflexible. FIG. 3 illustrates an embodiment of an inflexible dry sprinkler 350 that includes a rigid, inflexible conduit 310. The inflexible dry sprinkler is otherwise the same as the embodiment described in connection with FIG. 2, and the similar parts are identified with corresponding numbers. For example, the rigid, inflexible dry sprinkler 350 also includes an unbiased tie 320 that is depicted in an unengaged state in FIG. 3. The tie 320 is operably coupled to the thermally responsive element 342 of the sprinkler head 340 so that the tie becomes engaged when the thermally responsive element 342 reacts to an elevated temperature condition. Once the tie 320 becomes engaged, the valve opens and a fire suppression fluid is allowed to flow out of the sprinkler.

FIGS. 4-6B depict an embodiment of a flexible dry sprinkler and illustrate the operation of the fire sprinkler head and the engagement action that engages the tie to cause the valve to open.

Figure 4:
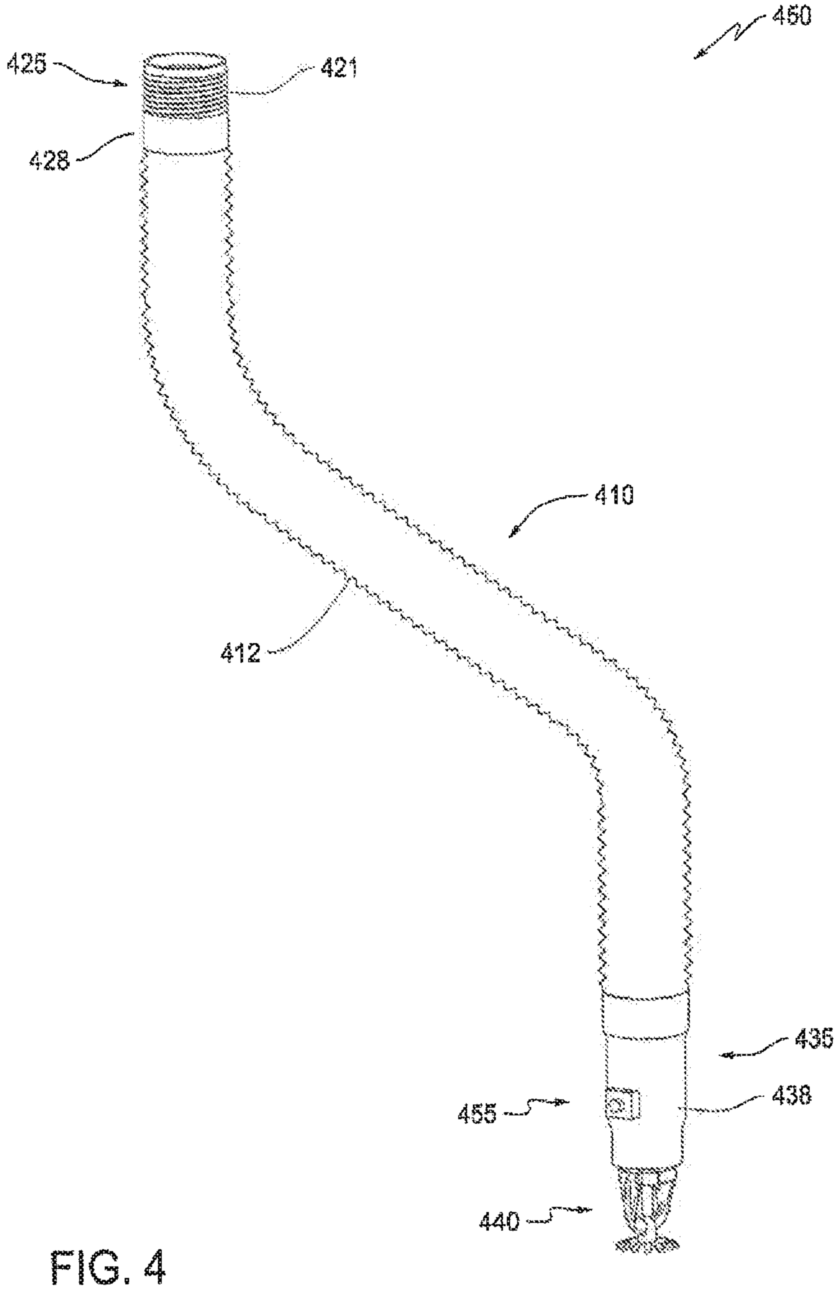
FIG. 4 is a perspective view of a flexible dry sprinkler according to one embodiment.
Figure 6A:
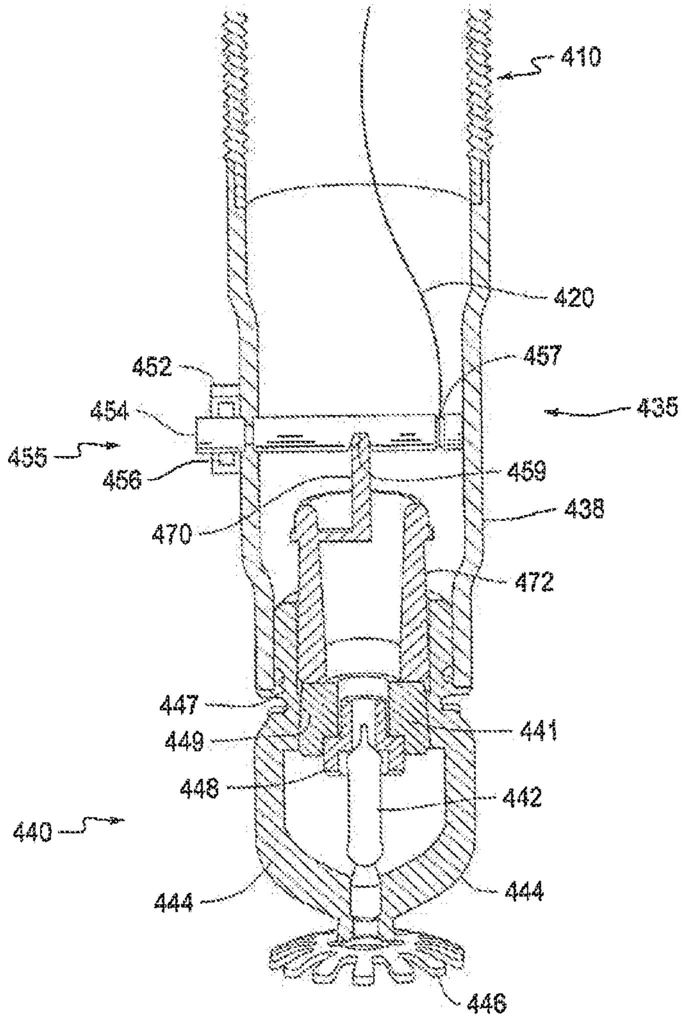
FIGS. 6A-6B are cross-sectional views of the second end section shown in FIG. 5 illustrating the dry sprinkler in a normal state (FIG. 6A) and illustrating the dry sprinkler in a state after the thermally responsive element reacts to an elevated temperature condition (FIG. 6B)
Figure 6B:
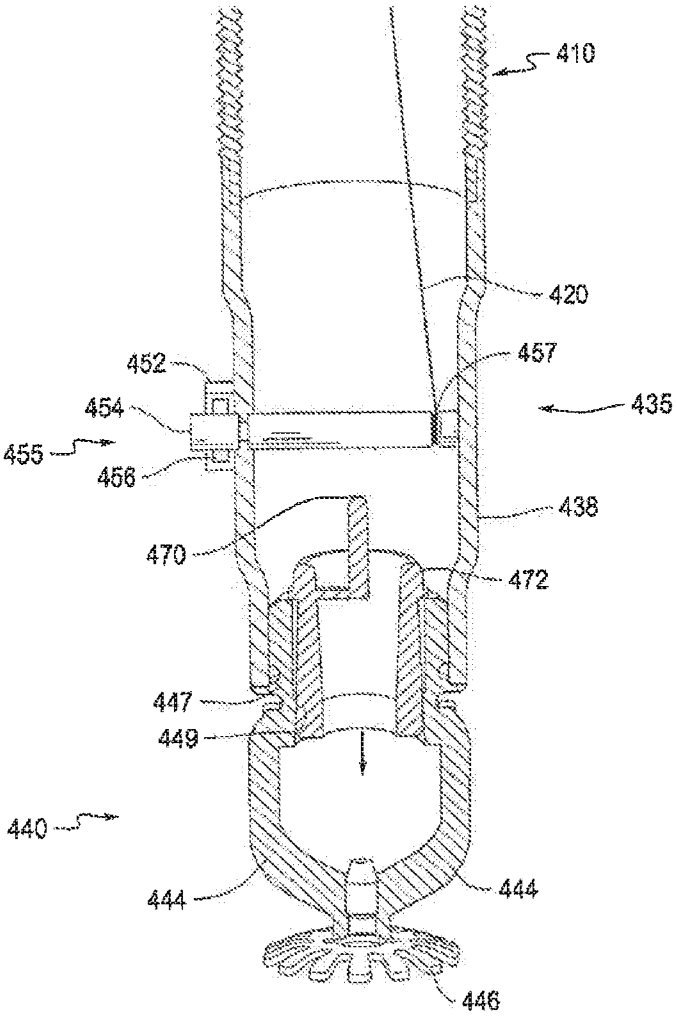

Referring to FIG. 4, the flexible dry sprinkler 450 includes a flexible conduit 410 that includes a flexible portion made of a metallic corrugated tube 412. The flexible conduit 410 has a first end portion 425 and a second end portion 435. The first end portion 425 includes a connector 428 with a threaded portion 421 that is configured to connect the dry sprinkler 450 to a branch line of a pipe network. The second end portion 435 of the flexible conduit has a reducer 438 that houses an engagement action 455 for engaging the tie 420 (FIGS. 6A-6B). A fire sprinkler head 440 is coupled to the second end portion 435. The reducer segments of the flexible conduit can be inflexible.

Figure 5:
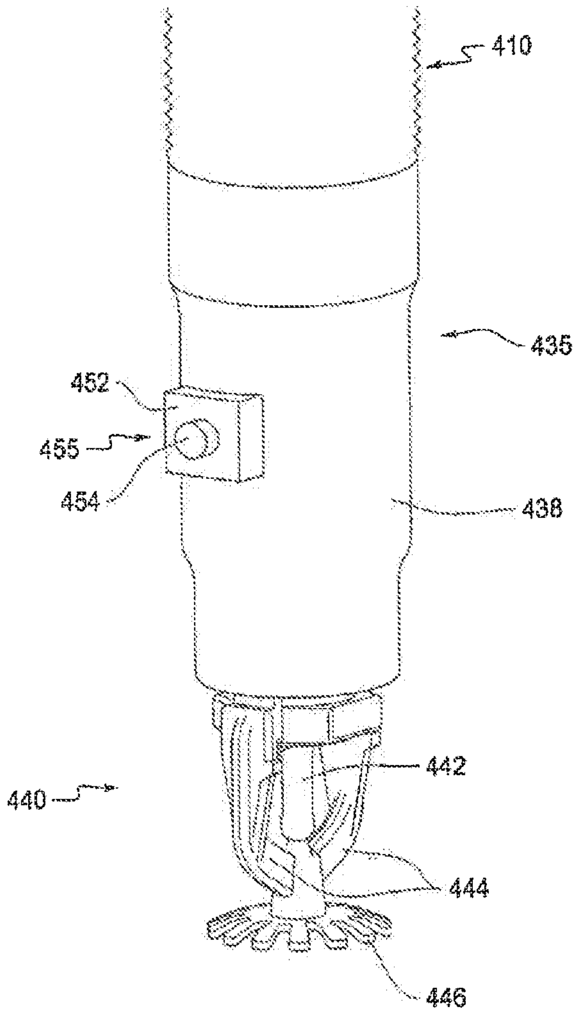
FIG. 5 is an enlarged view of the second end section (fluid outlet) of the flexible dry sprinkler shown in FIG. 4.

Referring to FIGS. 5-6B, the fire sprinkler head 440 is fitted into the second end of the conduit 410 in reducer 438. The fire sprinkler head 440 includes a body 447 that defines an opening 449 extending therethrough, a thermally responsive element 442, pip cap 448 and spacer 441 that are positioned in the opening 449, arms 444 that extend from the body 447, and a deflector 446 that is provided at the apex of the arms 444 to divert the flow of fluid laterally and downwardly when the sprinkler is activated. The thermally responsive element 442 can be, e.g., a glass bulb that breaks at a predetermined temperature or a fusible element that has a melting portion that melts at a predetermined temperature. Either of these reactions to the elevated temperature causes the pip cap 448 and spacer 441 to lose support and fall toward the deflector 446. The thermally responsive element can be set to react to different elevated temperature conditions, and can react when the temperature reaches, for example, 135° F., 175° F., 250° F., 325° F., 400° F. or even higher.

In this embodiment, the thermally responsive element 442, pip cap 448 and spacer 441 are operably coupled to the engagement action 455. A tubular support 472 is supported by spacer 441, which is in turn supported by the pip cap 448. The tubular support 472 includes pin 470 that fits in the detent 459 of shaft 454.

Shaft 454 is rotatably mounted in the flexible conduit 410. That shaft 454 is rotatably biased in one direction with a torsion spring 456 that is provided on the outside of reducer 438 within housing 452. In normal conditions, the pin 470 engages the detent 459 and prevents the shaft 454 from rotating. The shaft 454 includes a tie connection 457 that connects the tie 420 to the shaft 454.

FIG. 6A is a cross-sectional view of dry sprinkler 450 when the tie 420 is in an unengaged state and FIG. 6B is a cross-sectional view of the dry sprinkler 450 when the tie 420 is in an engaged state. The tie 420 illustrated in FIGS. 6A-B is a flexible string or a string-like member, such as a rope, ribbon or wire. In its unengaged state (FIG. 6A), the tie 420 is provided with slack, and is not biased in a direction toward the fire sprinkler head or in a direction toward the valve. As discussed in detail below, the tie 420 is operably coupled to the valve by a valve catch that is positioned proximate to the first end portion 425 (FIG. 4) of the flexible conduit 410. The valve catch (embodiments of which are described below in connection with FIGS. 11A-15B) is configured to cause the valve to move to an open state when the tie 420 is tensioned.

As shown in FIG. 6B, in the event of a fire or other elevated temperature condition, when the thermally responsive element 442 reacts to the elevated temperature condition, the spacer 441 and the support 472 will move outwardly with respect to the conduit 410, i.e., toward the deflector 446. The pin 470 will disengage from the detent 459, allowing the rotatably biased shaft 454 to rapidly rotate, thereby winding the tie 420 around the shaft 454. This action will apply a load to the tie 420, tensioning the tie 420 and causing the tie 420 to pull on the valve catch. The valve catch will then open the valve and fluid will flow through the conduit and out of the sprinkler head.

The engagement action that engages the tie 420 to apply a load thereto is not particularly limited to the disclosed embodiments. In general, the engagement action can store energy in the form of mechanical energy, potential energy, hydraulic energy, chemical energy, etc., and can release the energy to engage the tie and apply a load when the engagement action is triggered by the reaction of the thermally responsive element of the sprinkler head. Moreover, where the engagement action operates to apply tension to the tie, it may do so by winding (as in the embodiment shown in FIGS. 4-6), pulling, or otherwise displacing the tie to apply tension. Additional structures that may be operable to engage the tie are illustrated in FIGS. 7-10, and still other structures would be understood to be operable by those of ordinary skill in this field.

Figure 7A:
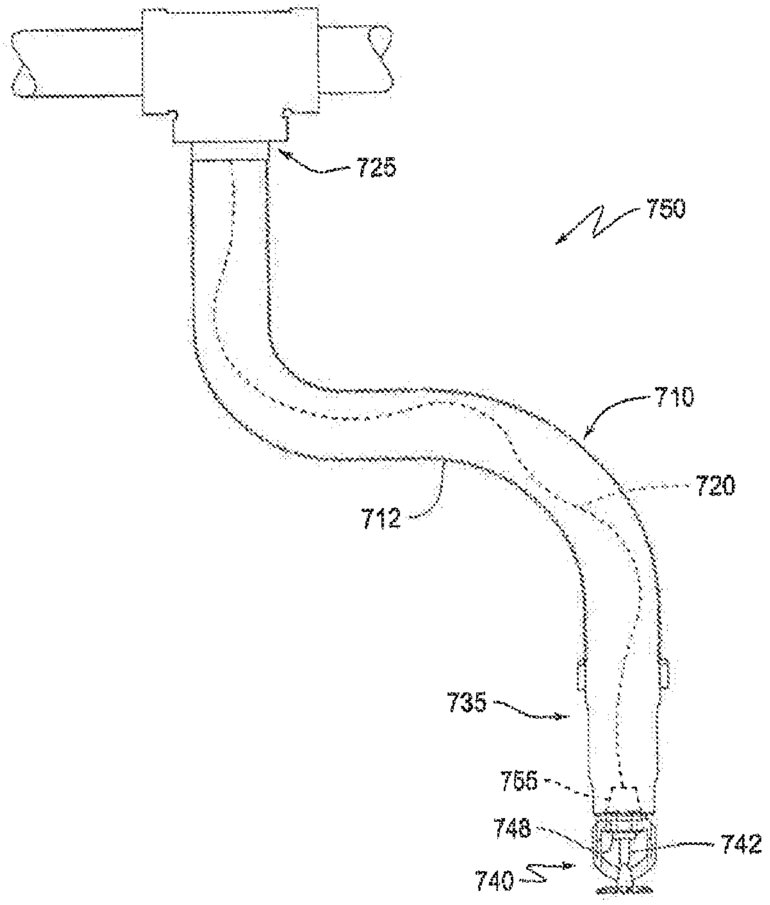
FIGS. 7A-7B are cross-sectional views showing another embodiment of a flexible dry sprinkler in a normal state (FIG. 7A) and showing the flexible dry sprinkler in a state after the thermally responsive element reacts to an elevated temperature condition (FIG. 7B)
Figure 7B:
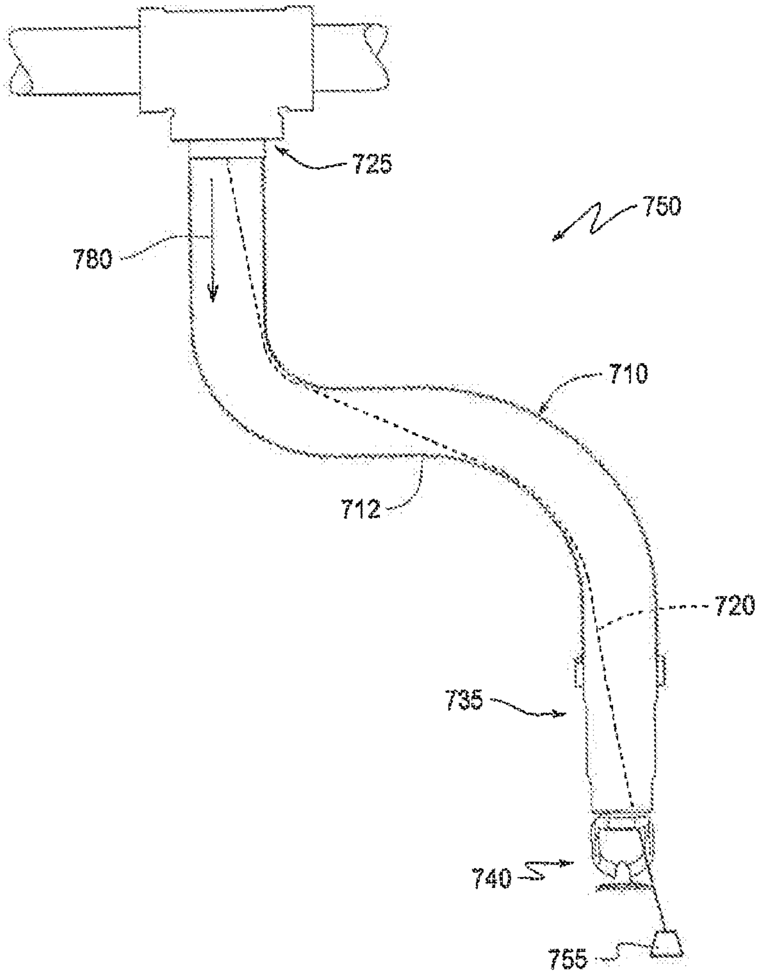

FIGS. 7A and 7B illustrate an embodiment where the engagement action includes a weight that applies a load to tie 720. Similar to the previously described embodiment, the dry sprinkler 750 includes a flexible conduit 710 with a corrugated tube 712. The flexible conduit 710 includes a second end portion 735 that is coupled to a fire sprinkler head 740. The tie 720 is a string or string-like member that is provided with slack in its normal or unengaged state (FIG. 7A).

The engagement action 755 can include a weight to which one end of the tie 720 is connected. The weight is supported by plug 748 of the fire sprinkler head 740. As shown in FIG. 7B, when the thermally responsive element 742 of the fire sprinkler head 740 reacts to the elevated temperature condition by breaking, the spacer 748 and the engagement action 755 fall through the sprinkler head 740. The weight of the engagement action 755 removes the slack of the tie 720 thereby applying tension to the tie and causing the valve that is positioned at the first end portion 725 to open. Opening the valve causes fluid 780 to flow downward from the valve, through the conduit and out of the fire sprinkler head.

Figure 8A:
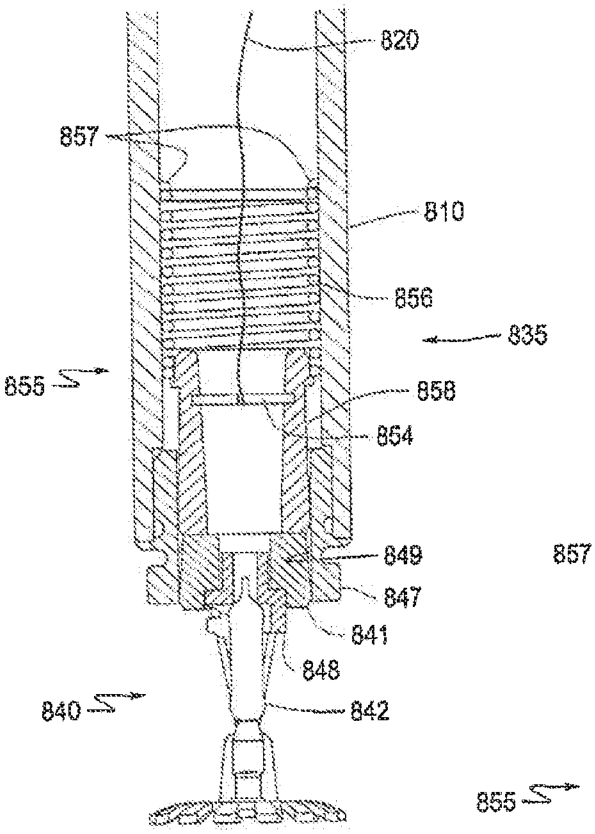
FIGS. 8A-8B are cross-sectional views showing the second end of another embodiment of a flexible dry sprinkler in a normal state (FIG. 8A) and showing the second end of the flexible dry sprinkler in a state after the thermally responsive element reacts to an elevated temperature condition (FIG. 8B)
Figure 8B:
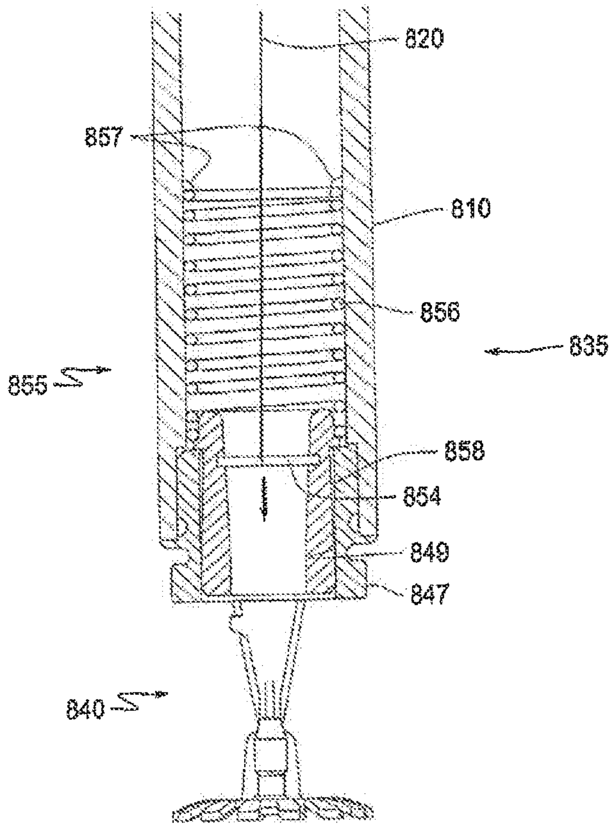

The engagement action of a flexible dry sprinkler according to yet another embodiment is illustrated by FIGS. 8A and 8B. The engagement action 855 is provided within the flexible conduit 810 and is located proximate to the second end portion 835 of the conduit. The engagement action 855 includes a compression spring 856, detents 857, a pin 854, and bushing 858. The pin 854 is a tie coupling member and is connected to an end portion of tie 820. FIG. 8A illustrates the tie in an unengaged state and FIG. 8B illustrates the tie in an engaged state.

The flexible dry sprinkler can include a fire sprinkler head 840 at its second end, which includes a body 847 defining an opening 849 therethrough. The fire sprinkler head 840 further includes a thermally responsive bulb 842, and a pip cap 848 and a spacer 841 that are positioned in opening 849.

As can be seen, the spacer 841 supports the bushing 858, which in turn supports the pin 854 that is connected to the tie 820. The compression spring 856 is present in the conduit under compression between detents 857 and the bushing 858, thereby biasing the bushing 858 and pin 854 toward the sprinkler head 840. The tie 820 in this embodiment is a string or string-like member that is provided with slack in its unengaged state, and is not affected by the compression of the spring in this state. The tie 820 remains unbiased toward the fire sprinkler head until the thermally responsive element 842 reacts to an elevated temperature condition.

As can be seen in FIG. 8B, when the thermally responsive element 842 of the fire sprinkler head 840 reacts to an elevated temperature condition, the bulb breaks, which causes the pip cap 848 and spacer 841 to lose support. The compression spring 856 pushes the bushing 858 and pin 854 downward, which rapidly removes slack from the tie, and applies a load to the tie to open the valve.

Figure 9A:
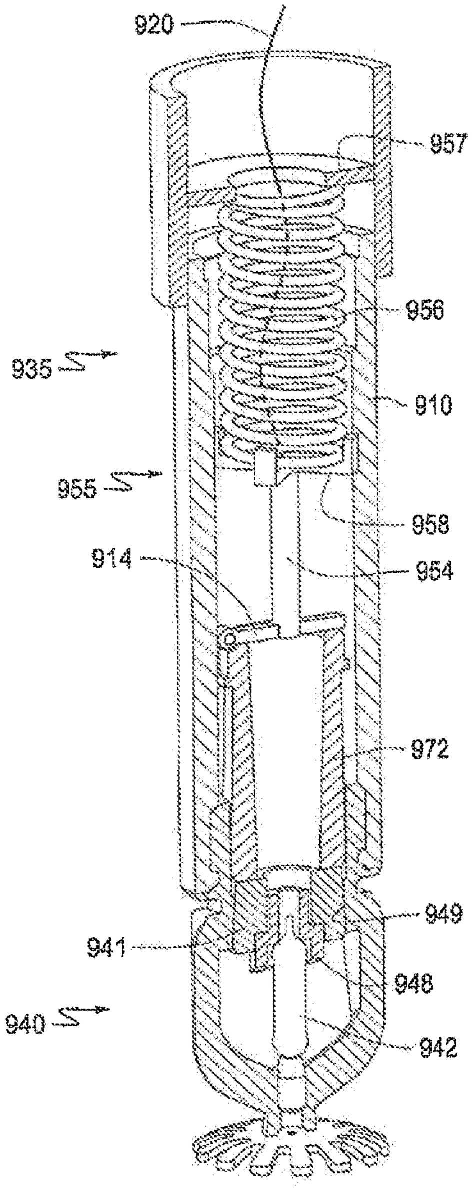
FIGS. 9A-9B are cross-sectional views showing the second end of another embodiment of a flexible dry sprinkler in a normal state (FIG. 9A) and showing the second end of the flexible dry sprinkler in a state after the thermally responsive element reacts to an elevated temperature condition (FIG. 9B)
Figure 9B:
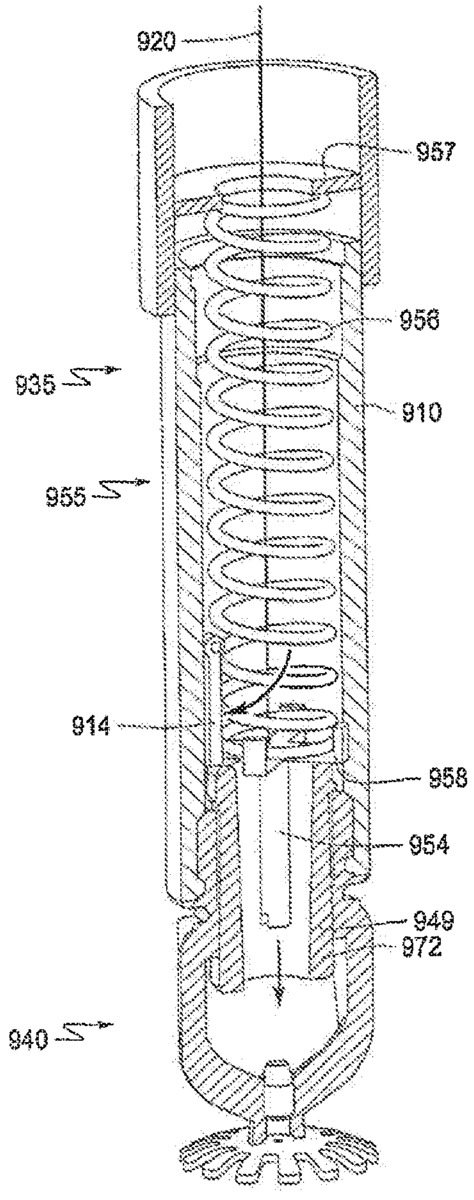

FIGS. 9A-9B illustrate another embodiment of an engagement action 955. In this embodiment, the engagement action 955 is provided within the flexible conduit 910 and is located proximate to the second end portion 935 of the conduit. Although flexible conduit 910 includes flexible portions so that the location of the sprinkler head can be positioned as discussed above, the portion of flexible conduit 910 illustrated in FIGS. 9A-9B is rigid and inflexible, which facilitates normal operation of the engagement action 955 when the conduit is bent. The engagement action 955 includes a compression spring 956, cross support member 958, extension rod 954, pivot bar 914, and bushing 972. The tie 920 is connected to cross support member 958. FIG. 9A illustrates the tie in an unengaged state and FIG. 9B illustrates the tie in an engaged state.

Similar to the FIG. 8 embodiment, a fire sprinkler head 940 is provided at the second end, which includes a thermally responsive bulb 942, and a pip cap 948 and a spacer 941 that are positioned in opening 949. The spacer 941 supports the bushing 972, which in turn supports the pivot bar 914, which supports extension rod 954 and cross support member 958. The compression spring 956 is present in the conduit under compression between detent 957 and the cross support member 958. The compression spring 956 urges the cross support member 958 downwardly toward the fire sprinkler head 940.

The tie 920 in this embodiment is a string or string-like member that is provided with slack in its unengaged state, and is not affected by the compression of the spring in this state. As shown in FIG. 9A, the tie 920 remains unbiased toward the fire sprinkler head until the thermally responsive element 942 reacts to an elevated temperature condition.

Referring to FIG. 9B, when the thermally responsive element 942 of the fire sprinkler head 940 reacts to an elevated temperature condition, the bulb breaks, which causes the pip cap 948 and spacer 941 to lose support. The compression spring 956 pushes the cross support member 958 and extension rod 954 toward the fire sprinkler head, which causes the bushing 972 to move downwardly in FIG. 9B. Once the bushing 972 moves down, the pivot bar 914 rotates from a horizontal position that supports extension rod 954 (FIG. 9A) to a vertical position that does not support extension rod 954 (FIG. 9B). Once the pivot bar 914 rotates, the extension rod 954 is pushed into the interior of bushing 972 as shown in FIG. 9B. This causes the cross support member 958 to move rapidly toward the sprinkler head, which removes slack from the tie 920 and applies a load to the tie 920 to open the valve. As compared to the FIG. 8 embodiment, this embodiment can allow a greater amount of slack to be removed from the tie because the portion of the engagement action that is coupled to the tie can travel a farther distance in the FIG. 9 embodiment.

The engagement action of a flexible dry sprinkler according to still another embodiment is illustrated in connection with FIGS. 10A and 10B.

Figure 10A:
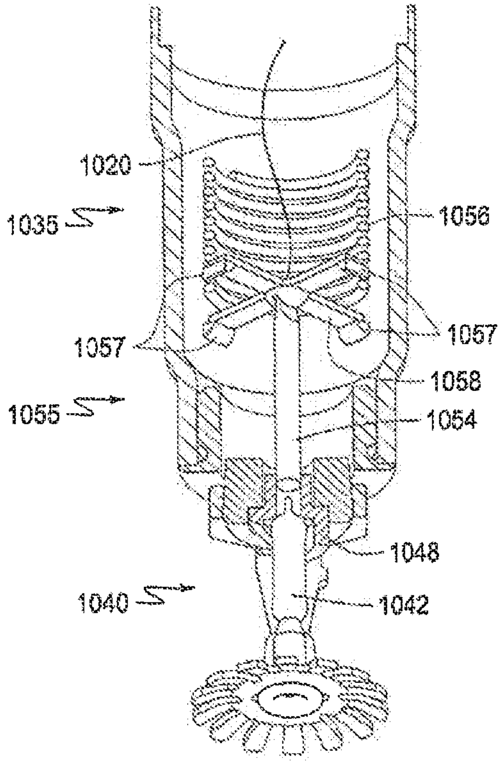
FIGS. 10A-10B are cross-sectional views showing the second end of another embodiment of a flexible dry sprinkler in a normal state (FIG. 10A) and showing the flexible dry sprinkler in a state after the fire sprinkler head reacts to an elevated temperature condition (FIG. 10B)

FIG. 10A illustrates a cut-away view of the second end 1035 of the flexible dry sprinkler in a normal state when the fire sprinkler head 1040 has not reacted to an elevated temperature condition. In this embodiment, the engagement action 1055 includes a cross support member 1058 that is supported by a pin 1054 that is in turn supported by the pip cap 1048 of the fire sprinkler head 1040. The cross support member 1058 is rotationally biased and under compression between detents 1057 and compression spring 1056. The tie 1020 is connected to the cross support member and is an untensioned string or string-like member.

Figure 10B:
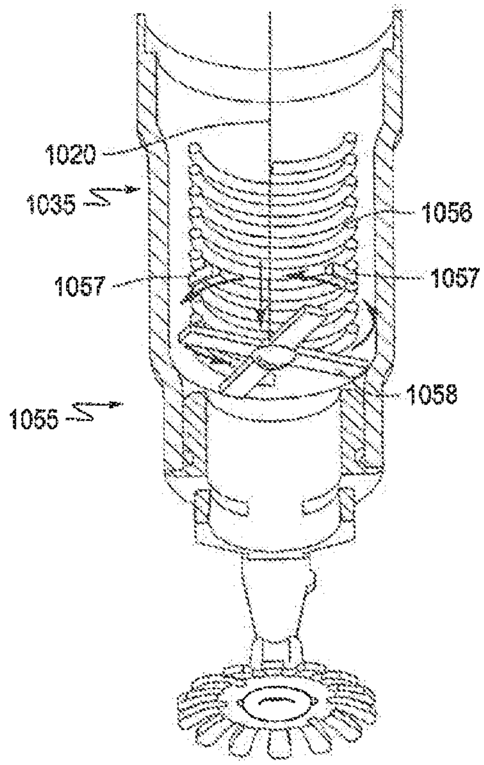

As shown in FIG. 10B, when the thermally responsive bulb 1042 of the fire sprinkler head 1040 reacts to an elevated temperature condition, the pip cap 1048 and pin 1054 become unsupported, which causes the cross support member 1058 to rotate off of the detents 1057 and causes the compression spring 1056 to push the cross support member 1058 outwardly toward the fire sprinkler head 1040. The movement of the cross support member 1058 toward the fire sprinkler head applies a load to the tie 1020, thereby tensioning the tie 1020 and pulling on a valve catch to open the valve.

As discussed above, the first end of the tie in each of the above embodiments is operably coupled to the valve by a valve catch that is configured to allow or cause the valve to move to an open state and preferably maintain the valve in the open state once the tie is engaged. In general, the valve can be biased into a closed state (e.g., biased by interference or by mechanical energy) in which fluid does not flow through the valve. The valve has an open state in which the bias is removed and fluid is allowed to flow through the valve. The valve catch can be operable to translate the load applied to the tie to release the valve bias to open the valve, as well as to maintain the valve in an open position. Exemplary embodiments illustrating the operation of the valve and valve catch are described below in connection with FIGS. 11A-15B.

Figure 11A:
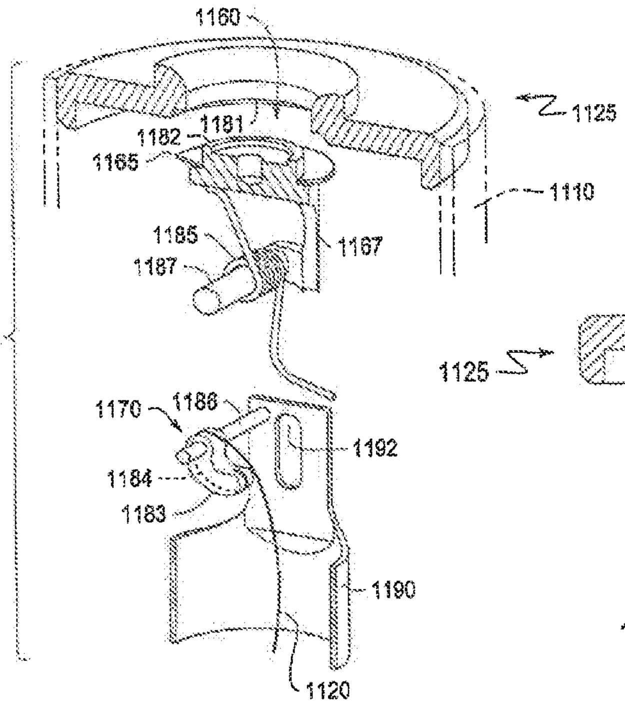
FIG. 11A is an exploded cross-sectional view showing the components of the first end section (valve and valve catch portion) of another embodiment of a dry sprinkler.
Figure 11B:
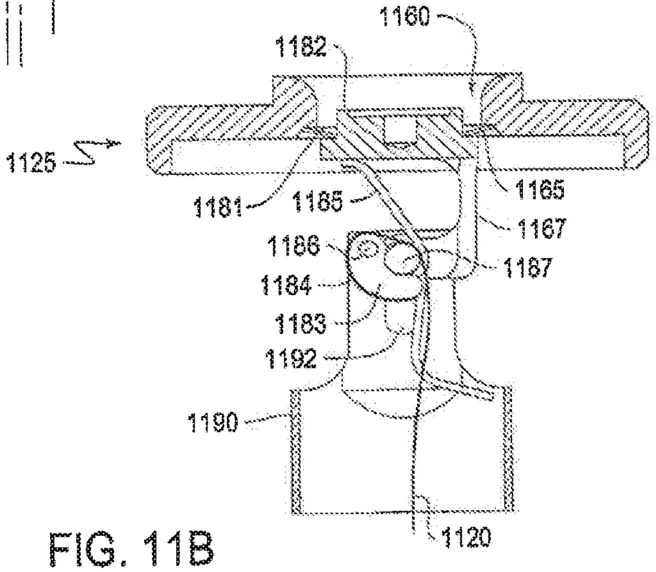
FIG. 11B is a partial cross-sectional view illustrating the first end section of the dry sprinkler in a normal state.
Figure 11C:
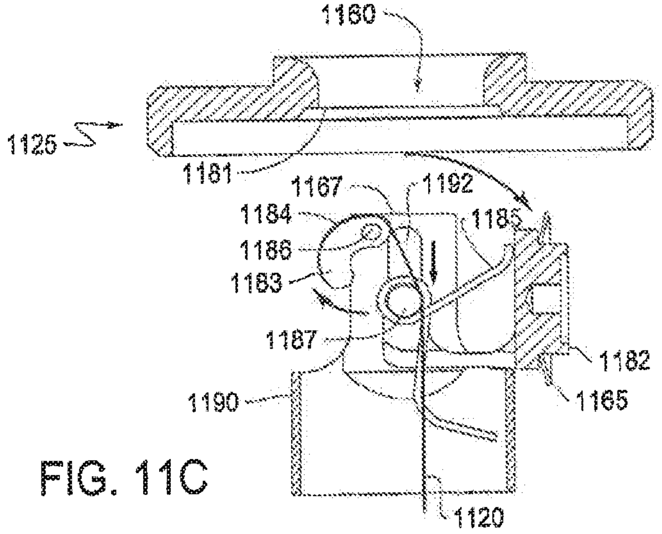
FIG. 11C is a partial cross-sectional view illustrating the first end section of the dry sprinkler once the tie is engaged in response to an elevated temperature condition.

FIGS. 11A-11C illustrate the valve 1160 and valve catch 1170 according to one embodiment of a dry sprinkler. In this embodiment, both the valve 1160 and the valve catch 1170 are positioned proximate to the first end 1125 of the conduit 1110. In dry sprinklers, the valve is generally positioned toward the first end (fluid inlet) of the sprinkler that is connected to the branch line. In the illustrated embodiments, the valve is positioned near the first end, which will allow the substantial majority of the dry sprinkler to be maintained in a dry state during normal operation (i.e., when the thermally responsive element remains intact, i.e., unreacted).

FIG. 11A is an exploded view that illustrates the parts of the valve catch 1170 and the valve 1160. The valve 1160 is located at valve opening 1181 near the first end of the conduit. As shown in FIG. 11B, the valve opening 1181 is closed by the cap 1182 and sealing ring 1165. The cap 1182 and valve housing 1167 are supported on pin 1187. The valve catch 1170 includes valve catch housing 1190 that supports rotation pin 1186 and hook 1183. The valve catch housing 1190 can be supported or secured within the conduit 1110 by any suitable structure. The valve catch housing 1190 includes an elongate groove 1192 that accommodates pin 1187, and the pin 1187 is movable within the elongate groove 1192. The groove 1192 extends in a direction along the length of conduit 1110.

As can be seen in FIG. 11B, when the valve is in the closed state, the pin 1187 is positioned at an upper end of the groove 1192. When the valve is in the closed state, the pin 1187 is supported in the upper end of groove 1192 by a rotatable hook 1183. The rotatable hook 1183 has a portion that extends underneath and contacts a lower portion of pin 1187 thereby supporting the pin 1187 and the cap 1182 in position that maintains the valve in a closed state. The hook 1183 is rotatably supported with respect to the housing 1190 about rotation pin 1186. The hook 1183 includes a groove 1184 that extends along the perimeter of hook 1183 and guides the tie 1120 around the hook perimeter.

FIG. 11C illustrates a state where tie 1120 is engaged by an engagement action in response to the thermally responsive element reacting to an elevated temperature condition. The engagement action applies a downward load to the tie 1120. In that state, the tie 1120 causes the hook to rotate clockwise (from the perspective of FIGS. 11B and 11C) around rotation pin 1186. When the hook 1183 rotates beyond a certain point, the pin 1187, the housing 1167, and the cap 1182 become unsupported in the upper portion of groove 1192 and are pushed downward (in FIG. 11C) by the force of gravity and/or the fluid pressure that is incident on the valve 1160. This pushes the sealing member (cap 1182 and sealing ring 1181) out of valve opening 1181 and thereby moves the valve 1160 into an open position. As can be seen in FIG. 11C, the cap 1182 can rotate 90 degrees by the force of torsion spring 1185. The tie 1120 is thereby operably coupled to the valve to allow the valve to open when the tie is engaged. Forming the valve and the valve catch so that the cap rotates out of the way of the fluid can prevent the cap from becoming lodged within the conduit and can thereby prevent blockage of the fluid flow in the event of a fire.

Figure 12A:
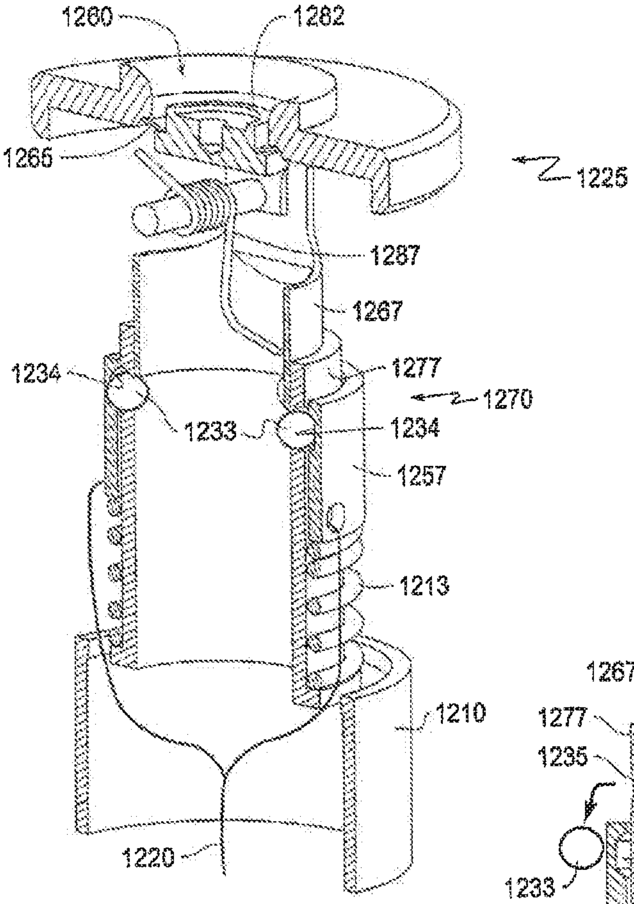
FIGS. 12A-12B are partial cross-sectional views illustrating the first end section of another embodiment of a dry sprinkler in a normal state (FIG. 12A) and showing the first end section once the tie is engaged in response to an elevated temperature condition (FIG. 12B)
Figure 12B:
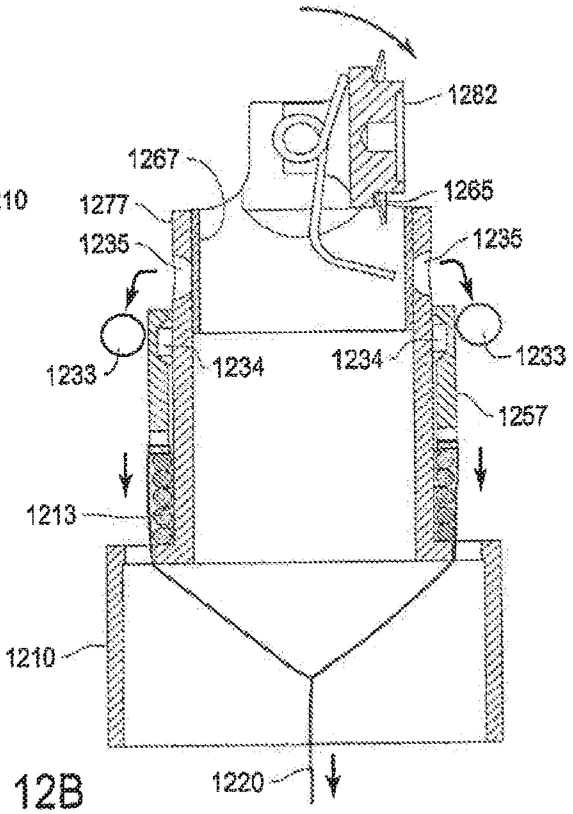

FIGS. 12A-12B are partial cut-out views illustrating a valve catch 1270 of another embodiment that is provided at a first end portion 1225 of a dry sprinkler. FIG. 12A illustrates the valve 1260 in a closed position and FIG. 12B illustrates the valve components in an open position. The valve 1260 includes cap 1282 and sealing ring 1265 that form a sealing member. The cap 1282 and sealing ring 1265 are rotatably supported on housing 1267 and are rotationally biased by torsional spring 1287.

The valve catch 1270 includes a compression spring 1213, retention ring 1257, support balls 1233, and outer housing 1277. The support balls are positioned in groove 1235 and extend partially through housing 1277. As can be seen in FIG. 12A, the balls 1233 support the housing 1267. The balls 1233 are held in place by retaining ring 1257 that is provided with groove 1234 to accommodate the support balls 1233. The retaining ring 1257 can optionally be held in place by a compression spring 1213. The retaining ring 1257 can also be held in place by sizing and arranging the balls 1233 and/or groove 1234 so that the balls are pressed against the retaining ring 1257 with sufficient force to hold it in place. The tie 1220 is connected to the retaining ring. FIG. 12A illustrates the sprinkler when the tie 1220 is in an unengaged state and when the valve catch 1270 has not been triggered.

FIG. 12B illustrates the valve catch in an activated state. In FIG. 12B, tie 1220 is tensioned in an engaged state and pulls the retaining ring 1257 with a force that overcomes the force of compression spring 1213. The tie 1220 pulls the retaining ring 1257 downwardly, which releases support balls 1233. Once the support balls 1233 are released, the housing 1267 moves downwardly which causes the cap

1282 and sealing ring 1265 to rotate 90 degrees from the force of torsion spring 1287, thereby opening the valve.

Figure 13A:
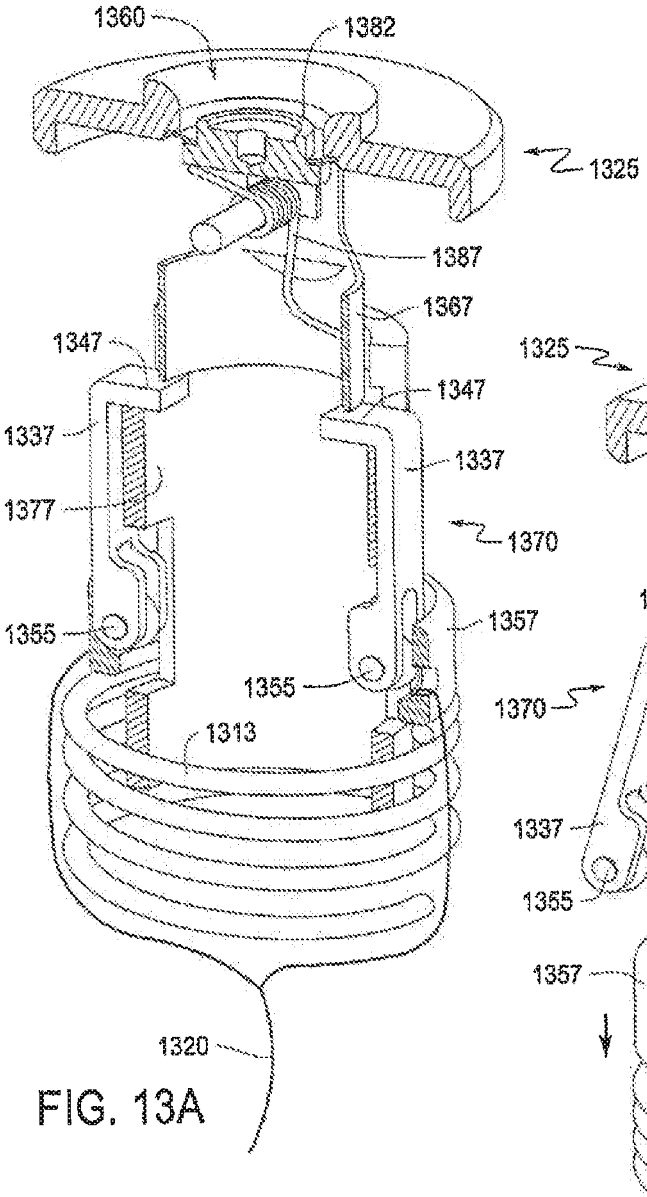
FIGS. 13A-13B are partial cross-sectional views illustrating the first end section of another embodiment of a dry sprinkler in a normal state (FIG. 13A) and showing the first end section once the tie is engaged in response to an elevated temperature condition (FIG. 13B)
Figure 13B:
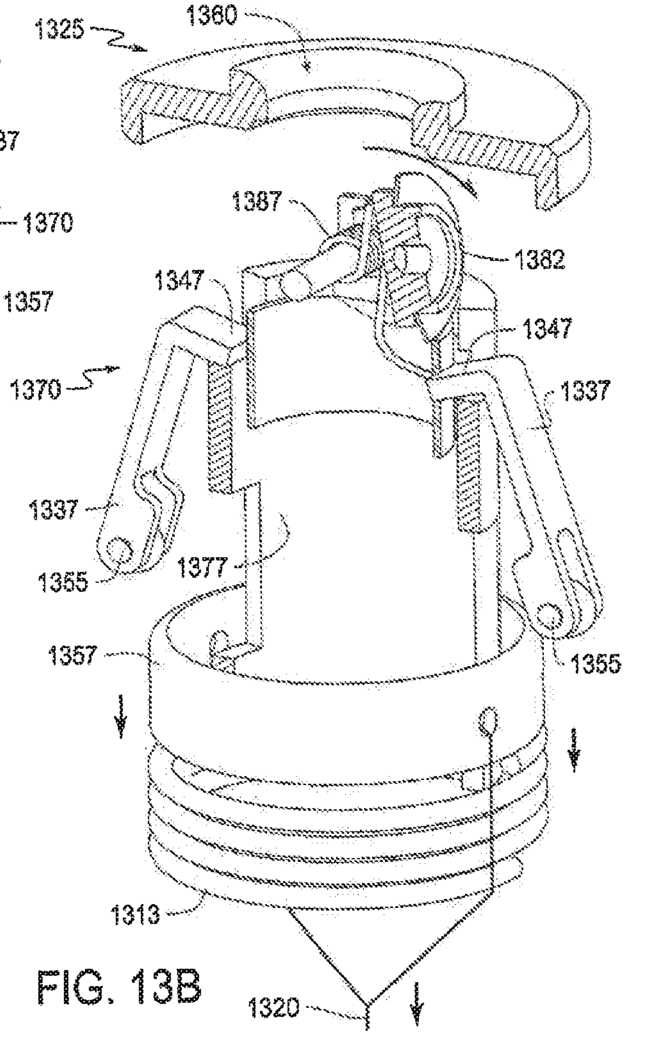

FIGS. 13A-13B are partial cut out views illustrating a valve catch 1370 that is provided at an end portion 1325 of a dry sprinkler. FIG. 13A illustrates the valve 1360 in the closed positions and FIG. 13B illustrates the valve 1360 in the open position. The valve components are similar to those in FIG. 12, and include cap 1382 that is rotatably supported on housing 1367. The cap 1382 is rotatably biased by torsion spring 1387. The valve catch 1370 includes pivot arms 1337 that have flange portions 1347. The flange portions 1347 support the housing 1367 and keep the valve in a closed position. The pivot arms 1337 are provided on the outer circumference of housing 1377, which includes holes or cutouts for receiving the flange portions 1347 at one end and the rotating end portions 1355 at the other end. The pivot arms 1337 are biased outwardly by the force of fluid pressure that presses the housing 1367 on the flange portions 1347 of the pivot arms 1337. The pivot arms 1337 are held into place by retaining ring 1357, which is supported by compression spring 1313. The retaining ring 1357 is connected to the tie 1320. FIG. 13A illustrates the sprinkler when the tie 1320 is in an unengaged state and when the valve catch 1370 has not been triggered.

FIG. 13B illustrates the valve catch 1370 in an activated state when the tie 1320 is engaged. In FIG. 13B, the tie 1320 is tensioned in an engaged state and pulls the ring 1357 downwardly. Once the ring 1357 is pulled down over the rotation ends 1355 of the pivot arms 1337, the downward force from the housing 1367 on the flange portions 1347 of the pivot arms 1337 causes the rotation ends 1355 of the pivot arms 1337 to rotate outwardly from housing 1377. This, in turn, causes the housing 1367 to move downwardly, which allows the cap 1382 to rotate by the force of torsion spring 1387, thereby opening the valve.

Figure 14A:
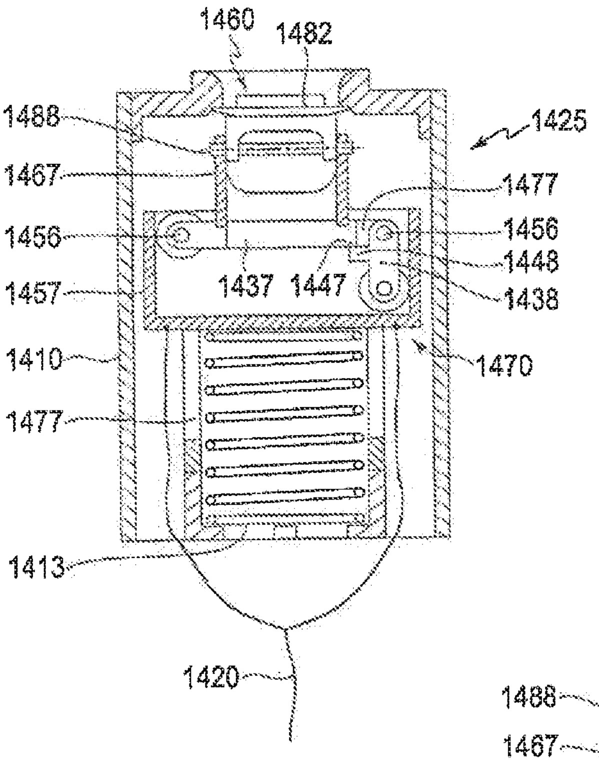
FIGS. 14A-14B are cross-sectional views illustrating the first end section of another embodiment of a dry sprinkler in a normal state (FIG. 14A) and showing the first end section once the tie is engaged in response to an elevated temperature condition (FIG. 14B)
Figure 14B:
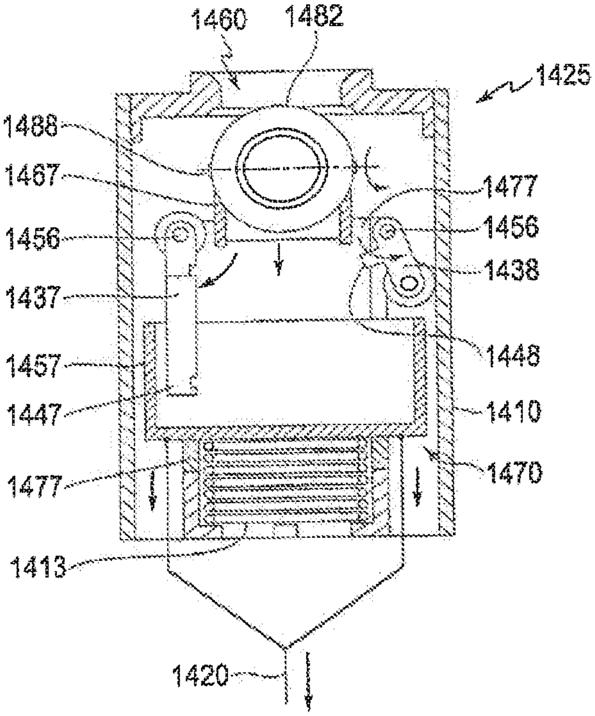

FIGS. 14A-14B are cross-sectional views illustrating a valve catch 1470 that is provided at a first end portion 1425 of a dry sprinkler. FIG. 14A illustrates the valve 1460 in the closed position and FIG. 14B illustrates the valve 1460 in the open position. The valve components are similar to those in FIG. 13, and include cap 1482 that is rotatably supported on housing 1467 about pin 1488. The cap 1482 is rotatably biased by a spring (not pictured). The valve catch 1470 includes a long pivot arm 1437 that rotates about pivot point 1456 and a short pivot arm 1438 that rotates about pivot point 1466. The long pivot arm 1437 includes an end portion 1447 and the short pivot arm 1438 includes flange portion 1448. The pivot arms 1437, 1438 are provided on the outer circumference of housing 1477. When the valve 1460 is in the closed position, the end portion 1447 of the long pivot arm 1437 rests on the flange portion 1448 of the short pivot arm 1438 so that the long pivot arm 1437 is supported in a position that it extends transversely across the conduit 1410. In this position, the long pivot arm 1437 supports the housing 1467 of the valve 1460. The force of the fluid incident on valve 1460 applies a force on the housing 1467 and long pivot arm 1437, which creates a rotation moment on the short pivot arm 1438.

The valve catch 1470 includes retaining ring 1457, which prevents the short pivot arm 1438 from rotating outwardly when the valve 1460 in a closed position. The retaining ring 1457 is supported by compression spring 1413. The tie 1420 is connected to the retaining ring 1457. FIG. 14A illustrates the sprinkler when the tie 1420 is in an unengaged state and when the valve catch 1470 has not been triggered.

FIG. 14B illustrates the valve catch 1470 in an activated state when the tie 1420 is engaged. In FIG. 14B, the tie 1420 is tensioned in an engaged state and pulls the ring 1457 downwardly. Once the ring 1457 is pulled down over the rotation ends of the short pivot arm 1438, the force that the housing 1467 exerts on the long pivot arm 1437 causes the end of the short pivot arm 1438 to rotate outwardly from housing 1477, which causes the long pivot arm 1437 to rotate clockwise from the perspective of FIGS. 14A and 14B. This, in turn, causes the housing 1467 to move downwardly, which allows the cap 1482 to rotate 90 degrees about pin 1488, thereby opening the valve.

Figure 15A:
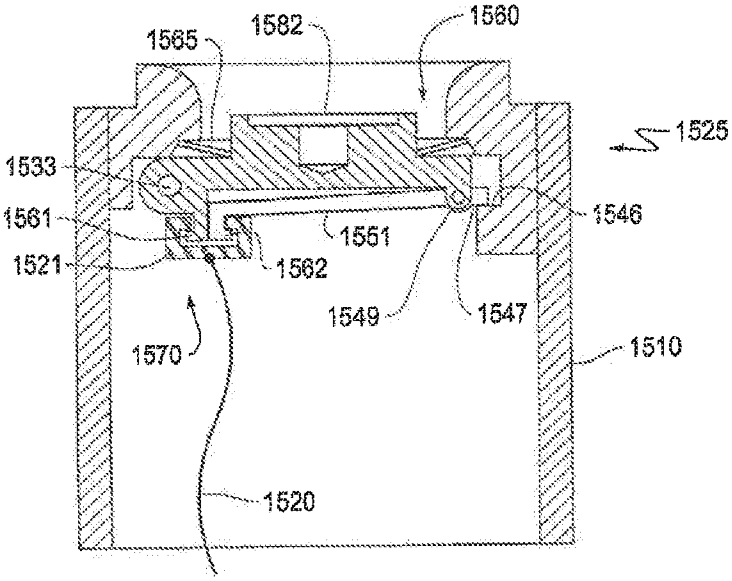
FIGS. 15A-15B are partial cross-sectional views illustrating the first end section of another embodiment of a dry sprinkler in a normal state (FIG. 15A) and showing the first end section once the tie is engaged in response to an elevated temperature condition (FIG. 15B)
Figure 15B:
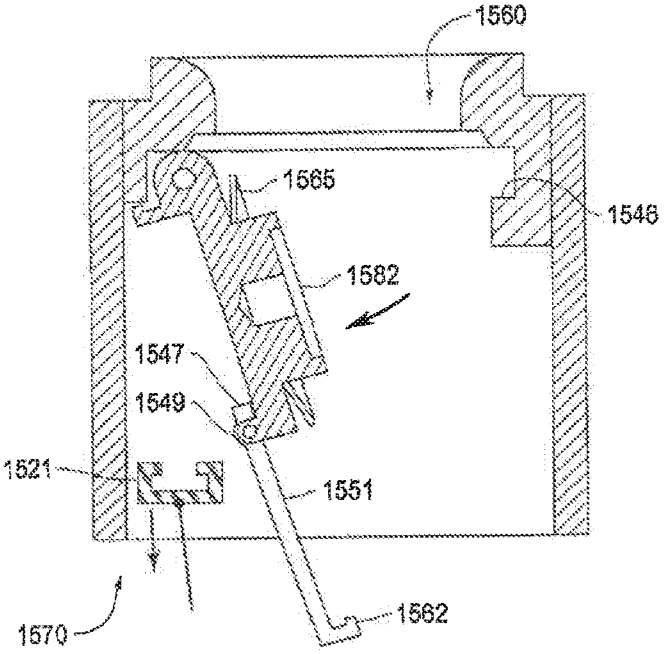

FIGS. 15A and 15B are cross-sectional views illustrating a valve catch 1570 that is provided at an end portion 1525 of a dry sprinkler. FIG. 15A illustrates the valve 1560 in a closed position and FIG. 15B illustrates the valve 1560 in an open position. In FIG. 15A, the valve catch 1570 includes clip 1521, lever 1551, and main pivot 1533. The cap 1582 and the sealing member 1565 are rotatably supported within the conduit by main pivot 1533. The lever 1551 is rotatably supported with respect to the conduit 1510 at pivot point 1549. In FIGS. 15A and 15B, the pivot point 1549 is located on the cap 1582 so that the lever 1551 is pivotally connected to cap 1582 at pivot point 1549. In a closed position, the cap 1582 is supported on the lever 1551 near pivot point 1549. In an alternative structure, the pivot point 1549 can be a pin that is supported on the conduit inner wall, so that the lever 1551 does not pivot on the cap 1582.

The lever 1551 includes an extending portion 1547 that is supported on notch 1546 of the sprinkler housing when the valve 1560 is in a closed state. On the other end, the lever 1551 includes a clip end 1562 that is held by clip 1521 when the valve 1560 is closed. The valve catch 1570 also includes a second clip end 1561 that is held by the clip 1521 when the valve 1560 is closed. The clip 1521 holds the lever 1551 in a horizontal position and prevents the lever 1551 from rotating about pivot point 1549. The clip 1521 is connected to tie 1520.

FIG. 15B illustrates the valve catch 1570 in an activated state when the tie 1520 is engaged. In FIG. 15B, the tie 1520 is tensioned in an engaged state and pulls the clip 1521 downwardly off of the clip ends 1561, 1562. When the clip 1521 is removed, the lever 1551 rotates about pivot 1549 which causes the extending portion 1549 to lift off of the notch 1546. This causes the cap 1582 to rotate about main pivot 1533 and open the valve.

Figure 16A:
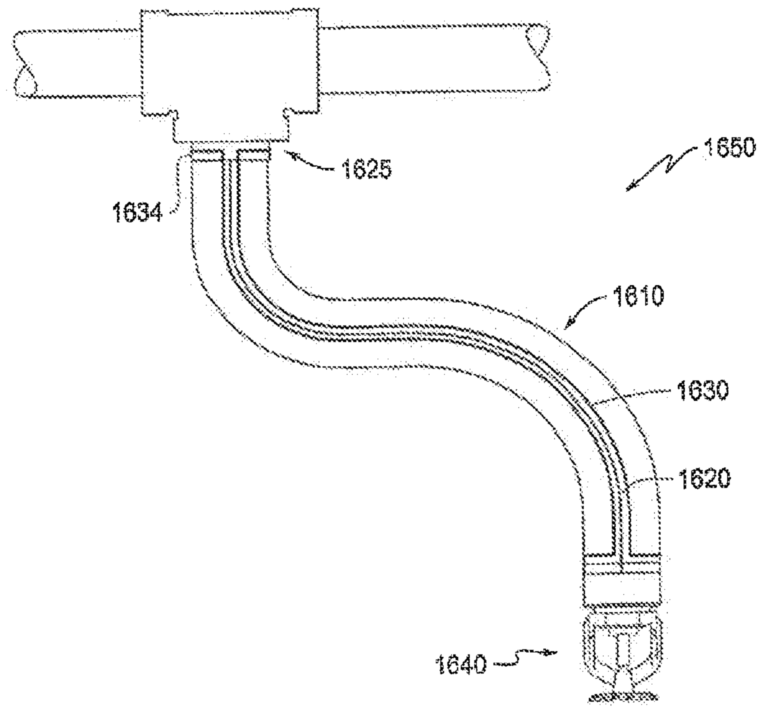
FIGS. 16A-16C are cross-sectional views illustrating a flexible dry sprinkler with a tie sheath.
Figure 16B:
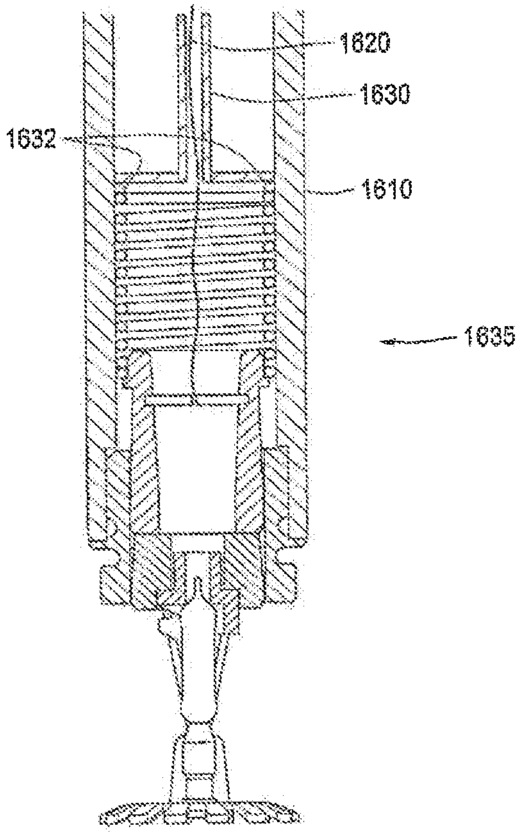
Figure 16C:
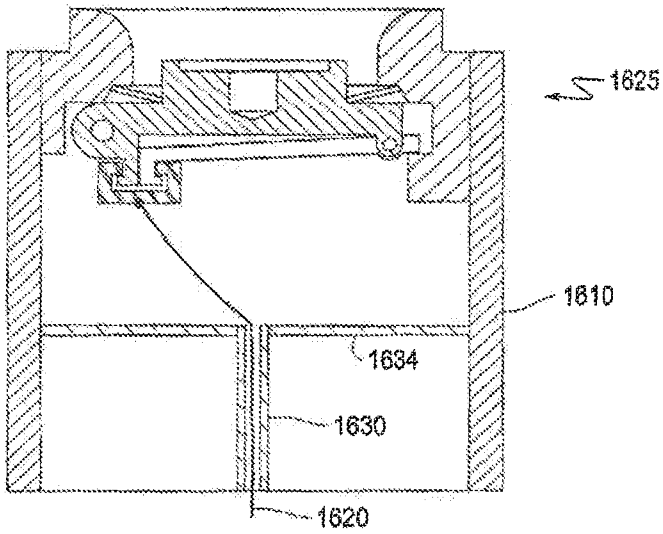

The flexible dry sprinklers can optionally include a tie sheath as shown in FIGS. 16A-16C. The flexible dry sprinkler 1650 can be provided with tie sheath 1630 that surrounds the tie 1620 over most of the length of tie 1620. The tie sheath 1630 can optionally be positioned centrally within conduit 1610. The tie sheath 1620 can be used to reduce the amount of slack that is created in tie 1620 when the flexible conduit 1610 is bent. Some slack may be desirable in the tie 1620 to prevent the tie 1620 from accidentally engaging and opening the valve when the conduit is bent or moved. However, when the conduit 1610 is bent to position the fire sprinkler head 1640, the amount of slack in tie 1620 will generally increase because the distance that the tie 1620 is required to span within the conduit 1610 to extend from the valve catch at one end to the engagement action at the other end becomes shorter as the conduit 1610 is bent, whereas the free length of the tie 1620 of course remains the same. The tie sheath 1630 holds the tie 1620 centrally within conduit 1610 which reduces the amount of slack that is introduced into the tie 1620 when the flexible conduit 1610 is bent, and thus prevents the need to eliminate extra slack when the engagement action is triggered.

The tie sheath 1630 can be a hollow tubular member that extends within the conduit substantially from the valve catch to the engagement action. The tie sheath 1630 can extend substantially the length of the conduit, i.e., at least 80% of the conduit length. The tie sheath 1630 can have a cross-sectional dimension (e.g., diameter) that is less than half of the cross-sectional dimension of the flexible conduit 1610.

As shown in FIG. 16B, the tie sheath 1630 can be coupled to cross bar member 1632 that centrally positions the sheath 1630 within the conduit 1610 proximate to the second end 1635. Similarly, as shown in FIG. 16C, the tie sheath 1630 can be coupled to a second cross bar member 1634 that centrally positions the sheath 1630 within the conduit 1610 proximate to the first end 1625. The tie sheath 1630 can be made of a flexible resilient material, e.g., a resilient polymer or rubber, that maintains a constant length when the flexible conduit 1610 is bent by deforming/bending to accommodate the bends of the conduit 1610 as illustrated in FIG. 16A.

Each of the valves and valve catches described above can be used in connection with any other embodiment, including any of the engagement actions, ties and/or tie sheaths described above. The type of valve and valve catch is likewise not particularly limited, and a person of ordinary skill in the art would understand that alternative structures would be operable to control the flow of fluid through the conduit. Moreover, although the valve is illustrated to be positioned within the conduit, the valve can be configured to be placed outside of the conduit upstream of the fluid inlet end of the conduit, for example, within the branch line.

The dry sprinklers described herein can be used with fire suppression systems to provide fire protection in unheated or refrigerated spaces. In some embodiments, the portion of the dry sprinkler that is upstream of the valve can be "wet". The portion of the dry sprinkler that includes the valve can be positioned in a heat-controlled space where the temperature is controlled so that it does not drop below a predetermined temperature. For example, the heat-controlled space can be controlled so that the temperature does not drop below 70° F., below 40° or below freezing. The "dry" portion of the sprinkler that is positioned downstream of the valve can be subjected to lower temperature conditions because there is no risk that the fire suppression fluid will freeze and rupture the conduit or otherwise disrupt the normal operation of the sprinkler. Thus, in some embodiments, the portion of the dry sprinkler that includes the fire sprinkler head is located in an unheated space where the temperature is not controlled. Such unheated spaces may include garages, attics, outdoor walkways, breezeways, parking garages, balconies, decks, loading docks, ducts, and the like. In still other embodiments, the portion of the dry sprinkler that includes the fire sprinkler head can be located in a refrigerated space where fire protection is desired (e.g., such as freeze lockers or walk-ins) and where temperatures are maintained at near or below a freezing temperature.

In other embodiments, the entire dry sprinkler can be located in unheated or refrigerated space if the flow of water is stopped upstream of the valve, e.g., at a main control valve. In this configuration, the entire sprinkler and connecting branch line remain dry and only the portion of the pipe network upstream of the control valve is wet. The control valve can then be triggered to open in the presence of a fire by a smoke detector or heat activated sensor.

While the disclosed dry sprinklers, sprinkler systems, methods of operation and methods of installing have been described in conjunction with exemplary embodiments, these embodiments should be viewed as illustrative, not limiting. It should be understood that various modifications, substitutes, or the like are possible within the spirit and scope of the disclosure.

What is claimed is:

1. A dry sprinkler comprising:

a fluid conduit that (i) is configured to couple to a fluid supply and (ii) has a first end and a second end;

a valve (a) having a valve opening and a sealing member, (b) positioned proximate to the first end of the fluid conduit and (c) configured to have (i) a closed state that prevents fluid from the fluid supply from flowing through the valve opening by engagement of the sealing member with the valve opening and (ii) an open state that allows fluid from the fluid supply to flow through the valve opening;

a fire sprinkler head positioned proximate to the second end of the fluid conduit; and a tie (i) in the fluid conduit, (ii) being operably coupled at opposite ends of the tie to the fire sprinkler head and the valve, and (iii) being configured to have an unengaged state in which the tie does not transmit a force on the valve sufficient to release the valve to change from the closed state to the open state and an engaged state in which the tie applies a force on the valve toward the fire sprinkler head sufficient to release the valve to change from the closed state to the open state, wherein the fluid conduit, the valve, the fire sprinkler head and the tie are configured such that:

the tie changes from the unengaged state to the engaged state when the fire sprinkler head is activated due to an elevated temperature condition;

the valve is in the closed state when the tie is in the unengaged state;

the valve is maintained in the closed state until the tie changes to the engaged state from the unengaged state and is not released to initially change to the open state from the closed state until the tie changes from the unengaged state to the engaged state;

the tie is untensioned when the tie is in the unengaged state;

changing the tie to the engaged state from the unengaged state releases the valve to change from the closed state to the open; and the sealing member remains in the fluid conduit after the valve has changed to the open state.

2. The dry sprinkler according to claim 1, wherein the fluid conduit, the valve and the tie are configured such that the tie does not have a compression force on the tie when the tie is in the unengaged state.

3. The dry sprinkler according to claim 1, wherein the fluid conduit, the valve and the tie are configured such that the tie in not under tension when the tie is in the unengaged state and the tie is in tension in the engaged state.

4. The dry sprinkler according to claim 1, further comprising an engagement action that is coupled to the tie, the engagement action being configured to be triggered when the fire sprinkler head is activated, the engagement action causing the tie to change from the unengaged state to the engaged state thereby allowing the valve to change from the closed state to the open state.

5. The dry sprinkler according to claim 1, wherein the tie is provided with slack in the unengaged state.

6. The dry sprinkler according to claim 1, wherein the fluid conduit is flexible.

7. The dry sprinkler according to claim 1, further comprising a sheath member that is located within the fluid conduit and surrounds the tie over most of a length of the tie.

8. The dry sprinkler according to claim 1, wherein the valve and the tie are configured such that the valve is released to change from the closed state to the open state due to change of the tie from the engaged state to the engaged state.

* * * * *